(12) United States Patent
Inoue

(10) Patent No.: US 11,233,916 B2
(45) Date of Patent: Jan. 25, 2022

(54) PRINTER AND NON-TRANSITORY COMPUTER-READABLE RECORDING MEDIUM STORING COMPUTER READABLE INSTRUCTIONS FOR PRINTER

(71) Applicant: BROTHER KOGYO KABUSHIKI KAISHA, Nagoya (JP)

(72) Inventor: Takuya Inoue, Nisshin (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/213,466

(22) Filed: Mar. 26, 2021

(65) Prior Publication Data

US 2021/0306472 A1 Sep. 30, 2021

(30) Foreign Application Priority Data

Mar. 27, 2020 (JP) .............................. JP2020-058723
Dec. 25, 2020 (JP) .............................. JP2020-217023

(51) Int. Cl.
*H04N 1/60* (2006.01)
*H04N 1/00* (2006.01)
*H04N 1/32* (2006.01)

(52) U.S. Cl.
CPC ....... *H04N 1/0097* (2013.01); *H04N 1/32117* (2013.01); *H04N 2201/3205* (2013.01); *H04N 2201/3222* (2013.01); *H04N 2201/3276* (2013.01)

(58) Field of Classification Search
None
See application file for complete search history.

(56) References Cited

U.S. PATENT DOCUMENTS

| | | | | |
|---|---|---|---|---|
| 2010/0182640 | A1* | 7/2010 | Daigo | G06F 21/608 358/1.15 |
| 2015/0317551 | A1* | 11/2015 | Mori | G06F 3/1238 358/1.14 |
| 2020/0034087 | A1* | 1/2020 | Iida | G06F 3/1228 |
| 2020/0125301 | A1 | 4/2020 | Kaneda | |

(Continued)

FOREIGN PATENT DOCUMENTS

| | | |
|---|---|---|
| JP | 2019-006099 A | 1/2019 |
| JP | 2019-119089 A | 7/2019 |

*Primary Examiner* — Henok Shiferaw
(74) *Attorney, Agent, or Firm* — Scully, Scott, Murphy & Presser, PC

(57) ABSTRACT

A printer may include a memory configured to store print setting information. The print setting information indicates M setting values corresponding to M setting items. Each time a print request including a plurality of setting values corresponding to a plurality of setting items including the M setting items is received, a controller of the printer may be configured to store number of times information in association with received information. In a case where first number of times information is stored in association with first received information and the first number of times information indicates that the number of times the print request was received is greater than or equal to a predetermined value, the controller may be configured to store first print setting information as new print setting information. The first print setting information may indicate M setting values indicated by the first received information.

20 Claims, 17 Drawing Sheets

(56) References Cited

U.S. PATENT DOCUMENTS

| | | | |
|---|---|---|---|
| 2020/0174723 A1* | 6/2020 | Yokoyama | G06F 3/1238 |
| 2020/0192617 A1* | 6/2020 | Otsuka | G06F 3/1238 |
| 2020/0285437 A1* | 9/2020 | Mori | G06F 3/1285 |
| 2020/0319830 A1 | 10/2020 | Kaneda et al. | |
| 2020/0406653 A1* | 12/2020 | Kubota | B41J 29/38 |

* cited by examiner

FIG. 2

Table 38:

| User Name | Password | Registered Preset Name | Preset Request Flag | SPA Flag |
|---|---|---|---|---|
| U1 | P1 | DPR | ON | OFF |
| U2 | P2 | DPR, RPR1 | ON | OFF |
| U3 | P3 | DPR, RPR2 | OFF | OFF |
| U4 | P4 | DPR, IPR | ON | ON |
| ... | ... | ... | ... | ... |

Table 40:

| Preset Name | Print Setting Information | | | | |
|---|---|---|---|---|---|
| | Paper Size | Color | Printing Side | Quality | |
| DPR | A4 | Monochrome | Single-Sided | Low | ← PI1 |
| RPR1 | A4 | Color | Single-Sided | Max | ← PI2 |
| RPR2 | B5 | Monochrome | Double-Sided | High | ← PI3 |
| RPR3 | A3 | Monochrome | Single-Sided | Low | ← PI4 |
| IPR | Letter | Monochrome | Single-Sided | Low | ← PI5 |
| ... | ... | ... | ... | ... | |

Table 44:

| User Name | Received Information | Number of Times |
|---|---|---|
| U1 | 0001 0001 0000 0000 | C1 |
| U1 | 0001 0000 0001 0010 | C2 |
| U1 | 0000 0000 0000 0010 | C3 |
| U2 | 0011 0000 0001 0001 | C4 |
| ... | ... | ... |

(Paper Size, Color, Printing Side, Quality)

Table 42:

| Code Value | 0000 | 0001 | 0010 | 0011 | 0100 | 0101 | 0110 |
|---|---|---|---|---|---|---|---|
| Paper Size | A3 | A4 | B4 | B5 | Letter | 4×6 photo | envelope |
| Color | Monochrome | Color | | | | | |
| Printing Side | Single-Sided | Double-Sided | | | | | |
| Quality | Max | High | Low | | | | |

FIG. 12
(Second Embodiment)

User Table of March — 38

| User Name | Password | Registered Preset Name |
|---|---|---|
| U1 | P1 | DPR, RPR1 |
| U2 | P2 | DPR, RPR2 |

Preset Table of March — 40

| Preset Name | Print Setting Information | | | |
|---|---|---|---|---|
| | Paper Size | Color | Printing Side | Quality |
| DPR | A4 | Monochrome | Single-Sided | Low |
| RPR1 | A4 | Color | Single-Sided | Max |
| RPR2 | B5 | Monochrome | Double-Sided | High |

Count Table of February — 44

| User Name | Received Information | Number of Times |
|---|---|---|
| U1 | 0001 0001 0000 0000 | 6 |
| U1 | 0001 0000 0001 0010 | 5 |
| U1 | 0000 0000 0000 0010 | 2 |
| U2 | 0011 0000 0001 0001 | 5 |

February Ends → Initialize Count Table

User Table of April — 38

| User Name | Password | Registered Preset Name |
|---|---|---|
| U1 | P1 | DPR, RPR3 |
| U2 | P2 | DPR, RPR4 |

Preset Table of April — 40

| Preset Name | Print Setting Information | | | |
|---|---|---|---|---|
| | Paper Size | Color | Printing Side | Quality |
| DPR | A4 | Monochrome | Single-Sided | Low |
| RPR3 | A3 | Monochrome | Single-Sided | Low |
| RPR4 | A4 | Color | Double-Sided | High |

Count Table of March — 44

| User Name | Received Information | Number of Times |
|---|---|---|
| U1 | 0001 0001 0000 0000 | 7 |
| U1 | 0001 0000 0001 0010 | 5 |
| U1 | 0000 0000 0000 0010 | 10 |
| U2 | 0011 0000 0001 0001 | 5 |
| U2 | 0001 0001 0001 0001 | 10 |

March Ends → Initialize Count Table

FIG. 16

(Third Embodiment)

```
PC                    100A              10
(User Name: U1)                      Printer
                                                    40
         (Same as Processes of FIG. 5)    Preset Information PI1 (DPR)
```

44

| User Name | Received Information | Number of Times | Inquiry Flag |
|---|---|---|---|
| U1 | 0001 0001 0000 0000 | 1 | OFF |

(Process of FIG. 5 Repeated Four Times)

(T610) Inquiry Flag = ON

44

| User Name | Received Information | Number of Times | Inquiry Flag |
|---|---|---|---|
| U1 | 0001 0001 0000 0000 | 5 | ON |

(Same as Processes of T10 to T22 of FIG. 5)

(T620) Capability Information (Preset Information PI1 (DPR), Inquiry Screen Data ("A4", "Color", "Single-Sided", "Max"))

(T624) Display Inquiry Screen D3     (T622) Inquiry Flag = OFF

D3:
Following Setting Values are Frequently Used. Do You Wish to Register as Preset?
- Paper Size : A4
- Color : Color
- Printing Side : Single-Sided
- Quality : Max

[YES]  [NO]

(T626) YES Button Selected (T630) Get-Printer-Attributes
(Preset Request, User Name U1, Password P1,
YES Selected Information ("A4", "Color", "Single-Sided", "Max"))

(Same as Processes of T80 to T84 of FIG. 6)

40

| | Preset Name | Print Setting Information | | | |
|---|---|---|---|---|---|
| | | Paper Size | Color | Printing Side | Quality |
| PI1 → | DPR | A4 | Monochrome | Single-Sided | Low |
| PI2 → | RPR1 | A4 | Color | Single-Sided | Max |

(Same as Processes from T100 of FIG. 7)

PRINTER AND NON-TRANSITORY COMPUTER-READABLE RECORDING MEDIUM STORING COMPUTER READABLE INSTRUCTIONS FOR PRINTER

CROSS-REFERENCE TO RELATED APPLICATION

This application claims priority to Japanese Patent Application No. 2020-058723, filed on Mar. 27, 2020 and Japanese Patent Application No. 2020-217023, filed on Dec. 25, 2020, the entire contents of which are incorporated herein by reference.

TECHNICAL FIELD

This disclosure herein discloses a printer configured to store print setting information.

BACKGROUND

An image-forming system including a communication device and an MFP (Multi-function Peripheral) is known. When a registration operation is executed, the communication device sends a print preset registration request according to Internet Printing Protocol (IPP) to the MFP. The MFP thereby registers the print preset.

SUMMARY

In the above technique, a user needs to perform the registration operation on the communication device in order to register the print preset in the MFP. The present disclosure provides a technique that can improve user convenience of a printer.

A printer disclosed herein may include: a print executing unit; a memory configured to store print setting information, the print setting information indicating M setting values corresponding to M setting items, M being an integer greater than or equal to 1; a communication interface; and a controller, wherein the controller is configured to: each time a print request including a plurality of setting values corresponding to a plurality of setting items including the M setting items is received via the communication interface, store number of times information in the memory in association with received information, the number of times information indicating a number of times the print request including the M setting items was received, and the received information indicating M setting values corresponding to the M setting items among the plurality of setting values included in the print request; in a case where first number of times information is stored in the memory in association with first received information and the first number of times information indicates that the number of times the print request was received is greater than or equal to a predetermined value which is greater than one, store first print setting information as new print setting information in the memory, the first print setting information indicating M setting values indicated by the first received information; in a case where a first predetermined command is received from an external device via the communication interface after the first print setting information has been stored in the memory, send one or more pieces of print setting information including the first print setting information stored in the memory to the external device via the communication interface; in a case where the first print setting information is selected among the one or more pieces of print setting information at the external device after the one or more pieces of the print setting information have been sent to the external device, receive a specific print request including specific information from the external device via the communication interface, the specific information being information for specifying a plurality of setting values including the M setting values indicated by the first print setting information; and in a case where the specific print request is received from the external device, cause the print executing unit to print an image to be printed according to the plurality of setting values specified by the specific information included in the specific print request.

Another printer disclosed herein may include: a print executing unit; a memory configured to store print setting information, the print setting information indicating M setting values corresponding to M setting items, M being an integer greater than or equal to 1; a communication interface; and a controller, wherein the controller is configured to: each time a print request including a plurality of setting values corresponding to a plurality of setting items including the M setting items is received via the communication interface, store number of times information in the memory in association with received information, the number of times information indicating a number of times the print request including the M setting items was received, the received information indicating M setting values corresponding to the M setting items among the plurality of setting values included in the print request; in a case where first number of times information is stored in the memory in association with first received information and the first number of times information indicates that the number of times the print request was received is greater than or equal to a predetermined value which is greater than one, send an inquiry to a first external device via the communication interface, the inquiry being for inquiring of a user whether to store first print setting information in the memory as new print setting information, the first print setting information indicating M setting values indicated by the first received information; in a case where information indicating that the first print setting information is to be stored in the memory as the new print setting information is received from the first external device via the communication interface, store the first print setting information as the new print setting information in the memory; in a case where a first predetermined command is received from a second external device via the communication interface after the first print setting information has been stored in the memory, send one or more pieces of print setting information including the first print setting information stored in the memory to the second external device via the communication interface; in a case where the first print setting information is selected among the one or more pieces of print setting information at the second external device after the one or more pieces of print setting information have been sent to the second external device, receive a first print request including specific information from the second external device via the communication interface, the specific information being information for specifying a plurality of setting values including the M setting values indicated by the first print setting information; and in a case where the first print request is received from the second external device, cause the print executing unit to print an image to be printed according to the plurality of setting values specified by the specific information included in the first print request.

A computer program and a non-transitory computer-readable recording medium storing computer readable instructions for realizing the aforementioned printer are also novel and useful. A method executed by the printer is also novel and useful. Moreover, a communication system comprising the above printer and external device(s) is also novel and useful.

BRIEF DESCRIPTION OF DRAWINGS

FIG. 2 shows tables;
FIG. 12 shows a transition diagram of tables of the second embodiment;
FIG. 16 shows a sequence diagram of a third embodiment.

DETAILED DESCRIPTION

Figure 1:
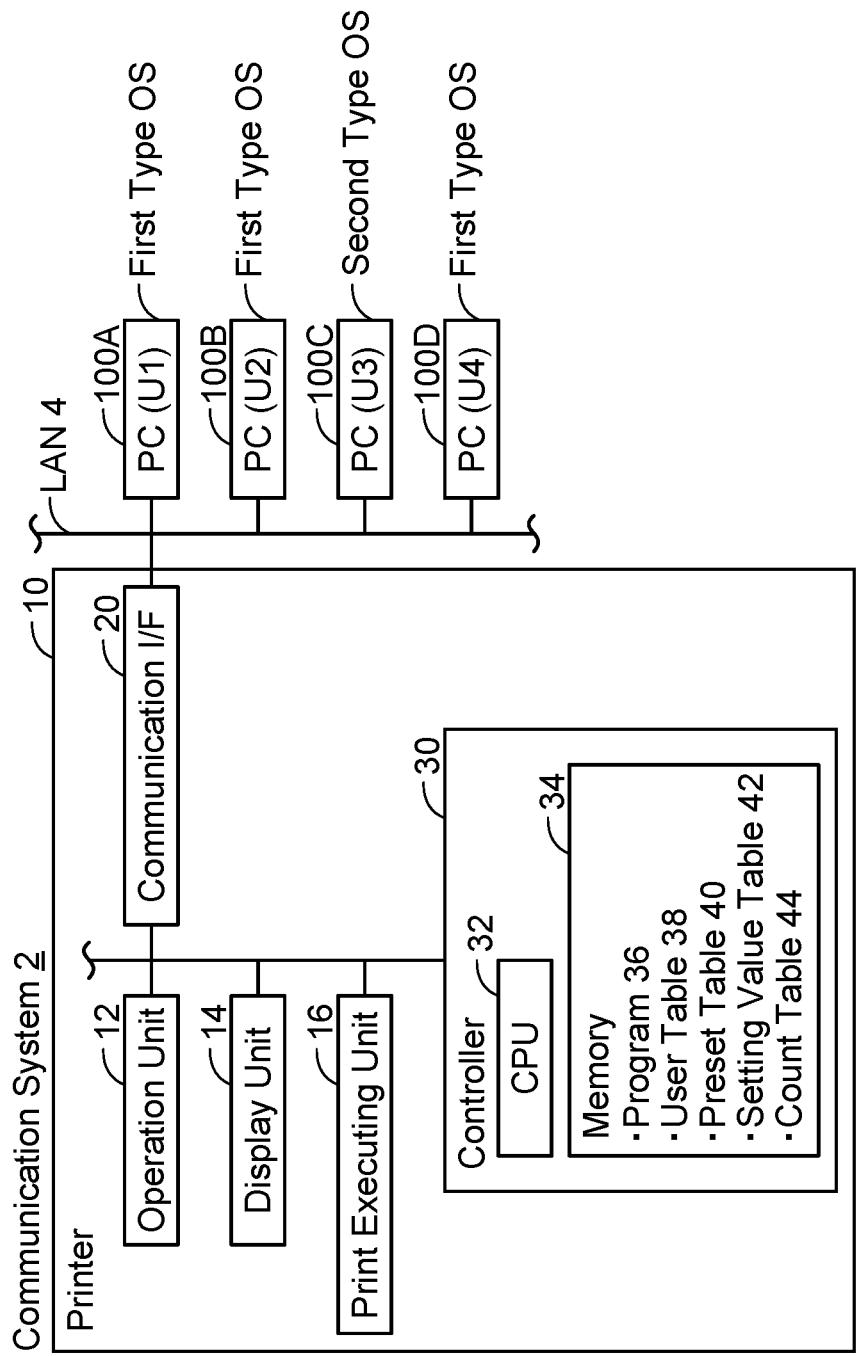
FIG. 1 shows a configuration of a communication system.

First Embodiment (Configuration of Communication System 2; FIG. 1)

As shown in FIG. 1, the communication system 2 includes a printer 10 and a plurality of PCs 100A to 100D. The printer 10 and the PCs 100A to 100D belong to the same Local Area Network (LAN) 4 and can communicate with each other via the LAN4.

(Configuration of Printer 10)

The printer 10 is a peripheral device configured to execute a print function (i.e., a peripheral device of the PCs 100A to 100D). In addition to these functions, the printer 10 may be a multi-function device configured to execute a scan function, a FAX function, and the like. The printer 10 includes an operation unit 12, a display unit 14, a print executing unit 16, a communication interface (hereinafter, the interface is referred to as "I/F") 20, and a controller 30.

The operation unit 12 includes a plurality of keys. The user can input various instructions to the printer 10 by operating the operation unit 12. The display unit 14 is a display for displaying various information. The display unit 14 also functions as a so-called touch screen (i.e., an operation unit). The print executing unit 16 is a printing mechanism such as an inkjet scheme, a laser scheme, or the like. The communication I/F 20 is connected to the LAN 4. The communication I/F 20 may be a wireless I/F or a wired I/F.

The controller 30 includes a CPU 32 and a memory 34. The CPU 32 executes various operations according to a program 36 stored in the memory 34. The memory 34 is configured of a volatile memory, a nonvolatile memory, and the like. The memory 34 stores a user table 38, a preset table 40, a setting value table 42, and a count table 44.

(Configurations of PCs 100A to 100D)

The PCs 100A to 100D are used by users of the printer 10. Usernames U1 to U4 for identifying the users who use these PCs are stored in the PCs 100A to 100D, respectively.

Each of the PCs 100 A, 100 B, and 100D includes a first type Operating System (OS). The first type OS is an OS configured to send a Get-Printer-Attributes command (hereinafter referred to as "GPA") including a preset request, and is, for example, macOS (registered trademark). The GPA command is a command according to Internet Printing Protocol (IPP), and is a command for requesting sending of capability information of the printer 10. The preset request is a command for requesting sending of preset information stored in the printer 10. The PC 100C includes a second type OS. The second type OS is an OS configured to send a GPA that does not include a preset request, and is, for example, Windows (registered trademark).

Each of the PCs 100A to 100D includes an IPP program (not shown) installed from a server on the Internet. The IPP program is a program for generating a command (for example, the above-described GPA command) according to Hyper Text Transfer Protocol (HTTP) and sending the generated command to the printer 10. In this embodiment, the server is provided by a business entity different from a vendor of the printer 10. In a variant, however, the server may be provided by the vendor of the printer 10. The PCs 100A to 100D may include the IPP program in advance without installing the IPP program from the server.

(Contents of Tables 38, 40, 42, 44; FIG. 2)

Next, the contents of the tables 38 to 44 stored in the printer 10 will be described with reference to FIG. 2.

In the user table 38, a username, a password, a registered preset name, a preset request flag, and an SPA (Set-Printer-Attributes) flag are stored in association with each other. The username and password are information used for user authentication and registered by an administrator of the printer 10. The registered preset name is a preset name for identifying the preset information available to the user. The preset request flag is set to a value of one of "ON" indicating that the GPA including the preset request has been received and "OFF" indicating that the GPA including the preset request has not been received. The SPA flag is set to a value of one of "ON" indicating that the SPA command has been received and "OFF" indicating that the SPA command has not been received. The SPA command is a command for requesting the printer 10 to for example register or delete the preset information.

One or more pieces of preset information PI1 to PI5 are stored in the preset table 40. The preset information is information in which the preset name and print setting information are associated with each other. The print setting information is information indicating four setting values corresponding to four print setting items (hereafter the print setting items may simply be referred to as "items"). Specifically, the print setting information includes a setting value corresponding to the item "paper size" (e.g., "A4", "B5" or the like), a setting value corresponding to the item "number of colors" (e.g., "monochrome" or "color"), a setting value corresponding to the item "printing side" (e.g., "single-sided" or "double-sided"), and a setting value corresponding to the item "quality" (e.g., "Max", "High" or "Low"). In a variant, the print setting information may not include all of the four setting values corresponding to the above four items, and may include, for example, three or less setting values corresponding to three or less of the four items. The print setting information may include a setting value corresponding to an item different from the four items described above (e.g., a paper type). The preset information PI1 including a preset name DPR is default preset information registered in advance before the printer 10 is shipped.

The setting value table 42 is a table showing a relationship among an item, a setting value, and a code value. The code value is a 4-bit binary value. For example, a setting value "A3" of the item "paper size" corresponds to a code value "0000", and a setting value "A4" of the item "paper size" corresponds to a code value "0001". Further, a setting value "monochrome" of the item "number of colors" corresponds to a code value "0000", and a setting value "color" of the item "number of colors" corresponds to a code value "0001".

The count table 44 stores the username, received information, and number of times information in association with each other. The received information includes four code values corresponding to the above four setting values included in a Create-Job (CJ) command according to the IPP. That is, the received information includes a 16-bit value (i.e., 4 bits×4). The first 4-bit code value (for example, the first "0001" in the top column) indicates the setting value corresponding to the item "paper size" (for example, "A4"). The next 4-bit code value (for example, the second "0001" in the top column) indicates a setting value corresponding to the item "number of colors" (for example, "color"). The next 4-bit code value (for example, the first "0000" in the top column) indicates a setting value corresponding to the item "printing side" (for example, "single-sided"). The last 4-bit code value (for example, the second "0000" in the top column) indicates a setting value corresponding to the item "quality" (for example, "Max"). Consequently, since the code values corresponding to the setting values are stored in the count table 44 instead of the setting values themselves (i.e., text), the memory capacity required for storing the count table 44 can be reduced. The CJ command is a command for requesting creation of a print job. The number of times information is information indicating the number of times the CJ command including the four setting values indicated by the received information was received.

Figure 3:
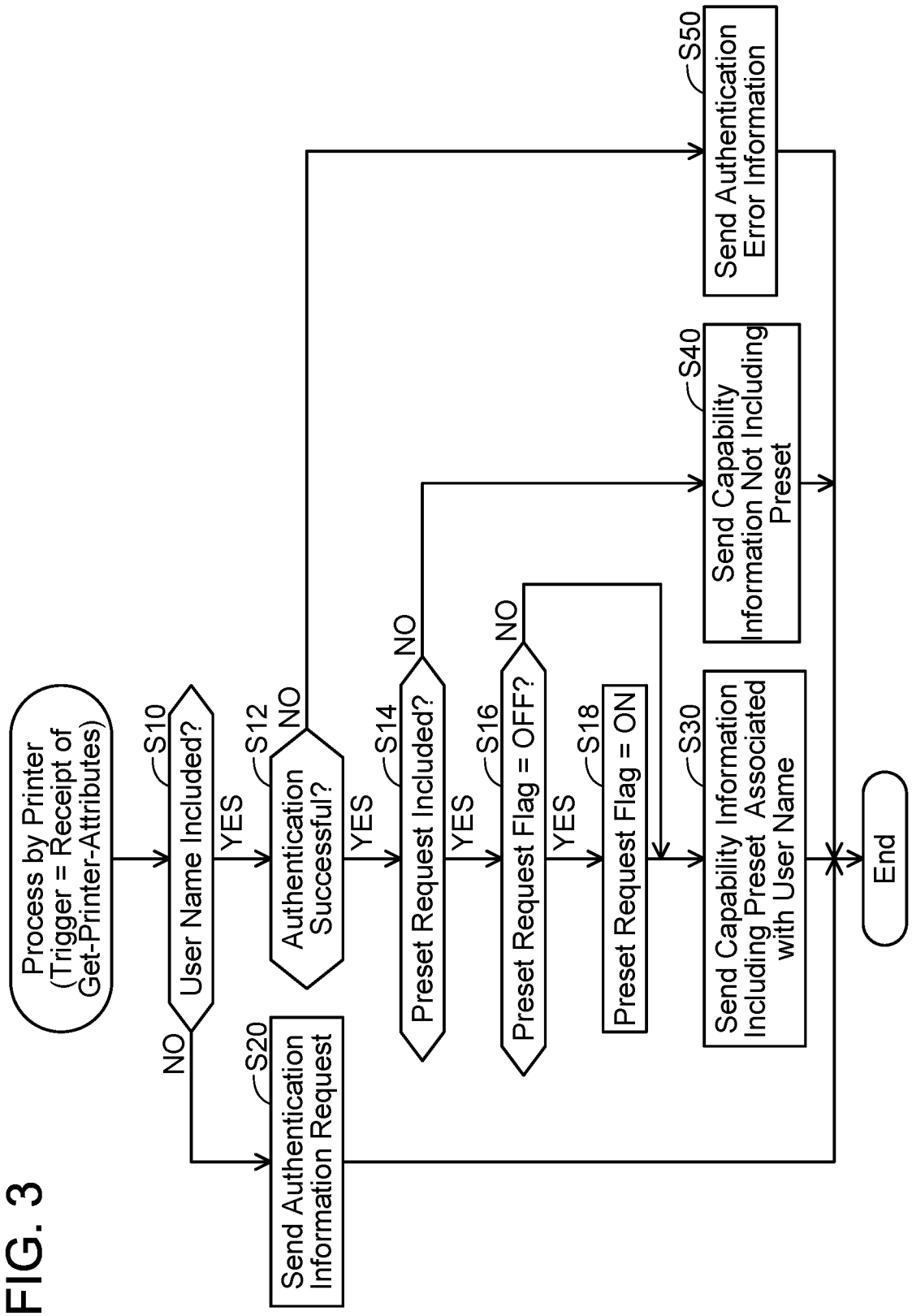
FIG. 3 shows a flowchart of a process by a printer.

(Process by Printer; FIG. 3)

Next, a process executed by the CPU 32 of the printer 10 will be described with reference to FIG. 3. The process of FIG. 3 begins with receipt of a GPA from any PC (e.g., 100A) as a trigger. Hereafter, a sender PC of the GPA is referred to as the "target PC". All of the following communications executed by the printer 10 are executed via the communication I/F 20. Therefore, in the following, the phrase "via the communication I/F 20" will be omitted.

In S10, the CPU 32 determines whether a username and a password are included in the GPA. The CPU 32 proceeds to S12 when it determines that the username and the password are included (YES in S10), while proceeds to S20 when it determines that the username and the password are not included (NO in S10).

In S20, the CPU 32 sends to the target PC an authentication information request for causing the target PC to display an authentication screen. The authentication screen is a screen for inputting a username and a password. When the process of S20 ends, the CPU 32 ends the process of FIG. 3. When a username and a password are inputted to the authentication screen, the GPA including the username and the password is sent from the target PC to the printer 10, and the process of FIG. 3 is restarted.

In S12, the CPU 32 executes user authentication. When a combination of the username and the password in the GPA is registered in the user table 38, the CPU 32 determines that the user authentication succeeds (YES in S12), and proceeds to S14. Hereafter, the username of the user which is successfully authenticated is referred to as "authenticated username". On the other hand, when the combination is not registered in the user table 38, the CPU 32 determines that the user authentication fails (NO in S14), and proceeds to S50.

In S50, the CPU 32 sends authentication error information to the target PC. When the process of S50 ends, the CPU 32 ends the process of FIG. 3.

In S14, the CPU 32 determines whether a preset request is included in the GPA. The CPU 32 proceeds to S16 when it determines that the preset request is included (Yes in S14), while proceeds to S40 when it determines that the preset request is not included (No in S14).

In S16, the CPU 32 refers to the user table 38 and determines whether the preset request flag associated with the authenticated username is OFF. When determining that the preset request flag indicates OFF (YES in S16), the CPU 32 proceeds to S18, while when determining that the preset request flag indicates ON (NO in S16), the CPU 32 skips S18 and proceeds to S30.

In S18, the CPU 32 changes the preset request flag associated with the authenticated username from OFF to ON.

In S30, the CPU 32 sends to the target PC capability information including preset information associated with the authenticated username. Specifically, the CPU 32 first refers to the user table 38 and identifies one or more preset names (e.g., DPR, RPR1) associated with the authenticated username (e.g., U1). Next, the CPU 32 refers to the preset table 40 and identifies one or more pieces of preset information (e.g., PH, PI2) including the one or more identified preset names. Next, the CPU 32 sends to the target PC the capability information including all the print conditions available on the printer 10 (i.e., all the setting values corresponding to the items (see the setting value table 42 in FIG. 2)) and the one or more pieces of identified preset information. When the process of S30 ends, the CPU 32 ends the process of FIG. 3.

A process of S40 is the same as the process of S30 except that the capability information does not include the preset information. When the process of S40 ends, the CPU 32 ends the process of FIG. 3.

Figure 4:
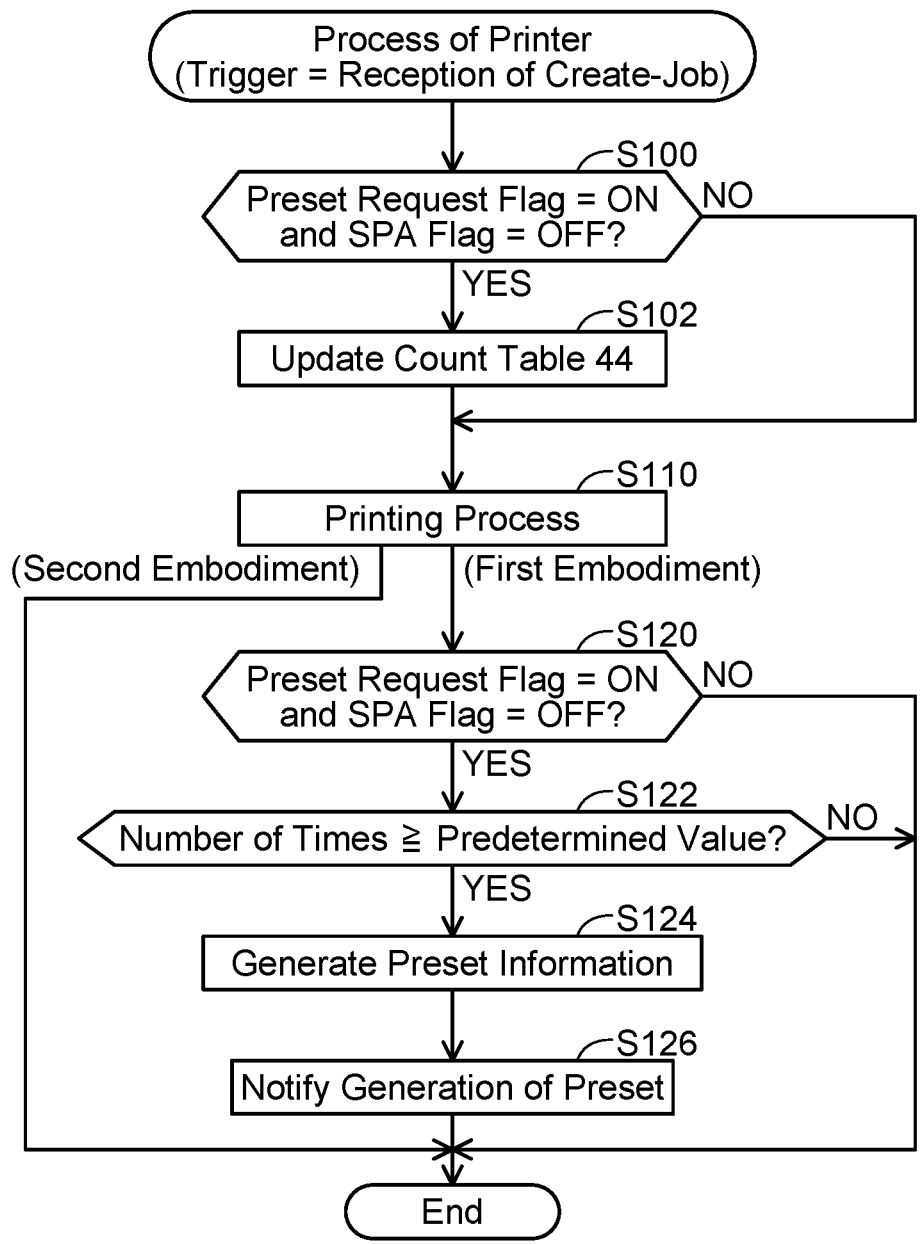
FIG. 4 shows a flowchart of a process by the printer.

(Process by Printer; FIG. 4)

Next, with reference to FIG. 4, other process performed by the CPU 32 of the printer 10 will be described. The process of FIG. 4 starts with receipt of a CJ from any PC (for example, 100A) as a trigger. Hereinafter, a sender PC of the CJ is referred to as "target PC". This CJ includes a username (hereinafter referred to as "target username") stored in the target PC.

In S100, the CPU 32 first refers to the user table 38 and determines whether the preset request flag associated with the target username is ON. When determining that the preset request flag is ON, the CPU 32 further refers to the user table 38 and determines whether the SPA flag associated with the target username is OFF. When the preset request flag indicates ON and the SPA flag indicates OFF, the CPU 32 determines YES in S100 and proceeds to S102. On the other hand, when the preset request flag indicates OFF or when the SPA flag indicates ON, the CPU 32 determines NO in S100, skips a process of S102, and proceeds to S110.

In S102, the CPU 32 updates the count table 44. Specifically, the CPU 32 first identifies four setting values corresponding to the above four setting items (i.e., paper size, number of colors, printing side, and quality) from among a plurality of setting values corresponding to a plurality of setting items included in the CJ. The CPU 32 uses the setting value table 42 and identifies respective code values corresponding to the four identified setting values. The CPU 32 generates the received information by arranging the four identified code values in order. Then, the CPU 32 determines whether a combination of the target username and the received information has already been stored in the count table 44. When determining that the combination has already been stored, the CPU 32 increments the number of times information associated with this combination by "1". On the other hand, when determining that the combination has not yet been stored, the CPU 32 newly stores this combination and the number of times information "1" in the count table 44 in association with each other.

In S110, the CPU 32 executes the printing process according to the plurality of setting values corresponding to the plurality of setting items included in the CJ. Specifically, the CPU 32 receives image data representing an image to be printed from the target PC, converts the image data according to the plurality of setting values, and generates print data that can be interpreted by the print executing unit 16. Then, the CPU 32 supplies the print data to the print executing unit 16. As a result, printing is executed by the print executing unit 16.

The process of S120 is the same as the process of S100. In S122, the CPU 32 determines whether received information associated with the number of times information indicating a predetermined threshold value "5" (hereinafter, referred to as "target received information") exists in the count table 44. When determining that the target received information exists (Yes in S122), the CPU 32 proceeds to S124, while when determining that the target received information does not exist, the CPU 32 determines NO in S122, and ends the process of FIG. 4. In a variant, the threshold value used in S122 needs not to be "5", and the threshold value may be any value from 2 to 4, or may be a value of 6 or more.

In S124, the CPU 32 generates preset information. Specifically, first, the CPU 32 reproduces the four setting values from the four code values included in the target received information by using the setting value table 42. Then, the CPU 32 newly stores the preset information including the preset name and the reproduced four setting values in the preset table 40. Here, the preset name is generated by the CPU 32. The CPU 32 further stores the preset name as a registered preset name in the user table 38 in association with the target username.

The CPU 32 may skip the process of S102 of FIG. 4 when the received information associated with the number of times information "5" exists. That is, when the number of times information associated with the combination of the target username and the received information indicates "5" at the stage of S102, the CPU 32 skips the process of S102 of FIG. 4 (that is, without incrementing the number of times information to "6"), and proceeds to S110. This is because, since the preset information corresponding to the combination has already been registered, it is unnecessary to increment the number of times information.

In S126, the CPU 32 sends to the target PC a preset generation notification indicating that the preset information has been newly stored. The preset generation notification is a PrintStateMessage (hereinafter referred to as "PSM") according to the IPP. When the process of S126 ends, the process of FIG. 4 ends.

(Specific Cases; FIGS. 5-11)

Next, with reference to FIGS. 5 to 11, specific cases A to D realized by the processes of FIGS. 3 and 4 will be described.

Figure 5:
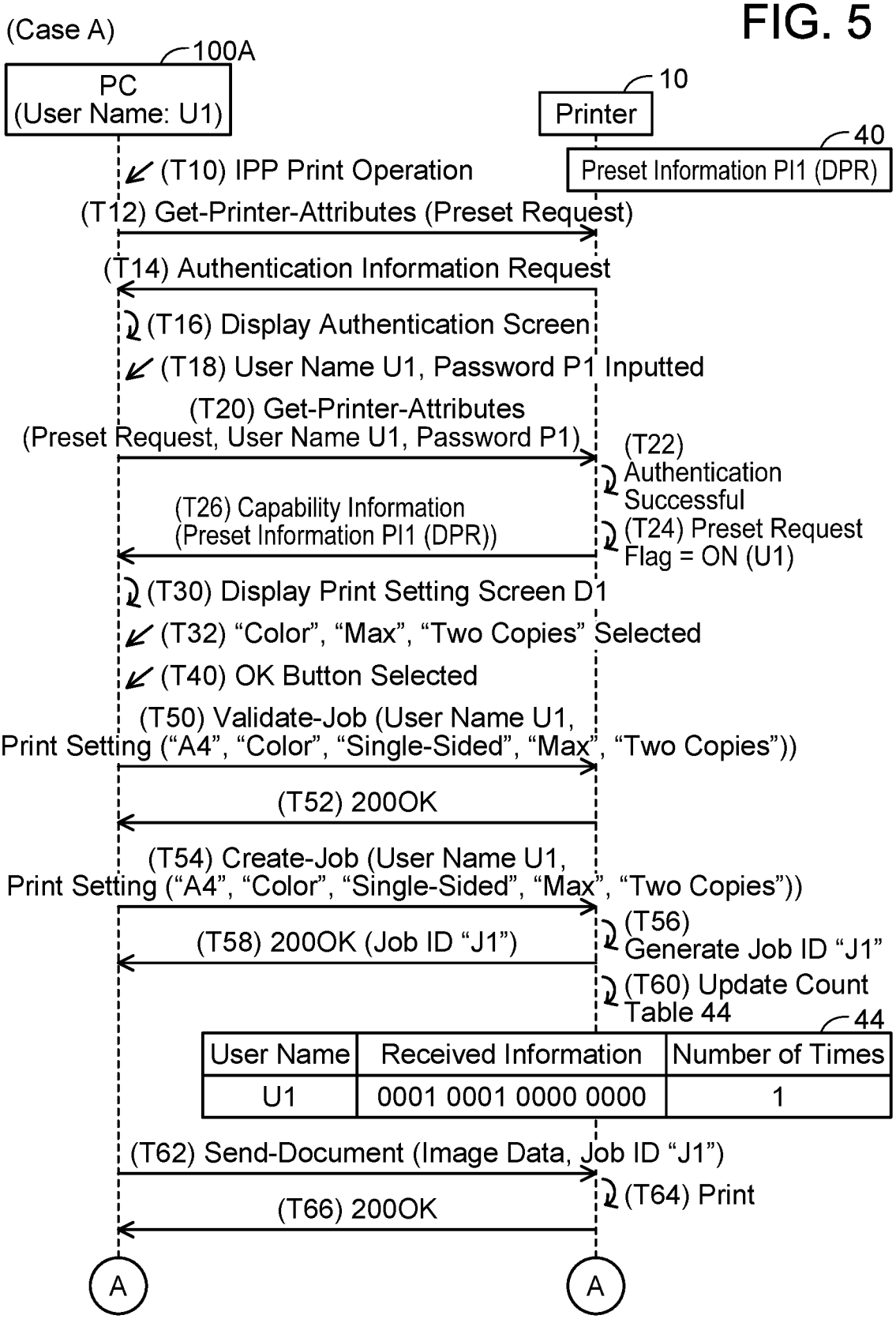
FIG. 5 shows a sequence diagram of Case A.
Figure 6:
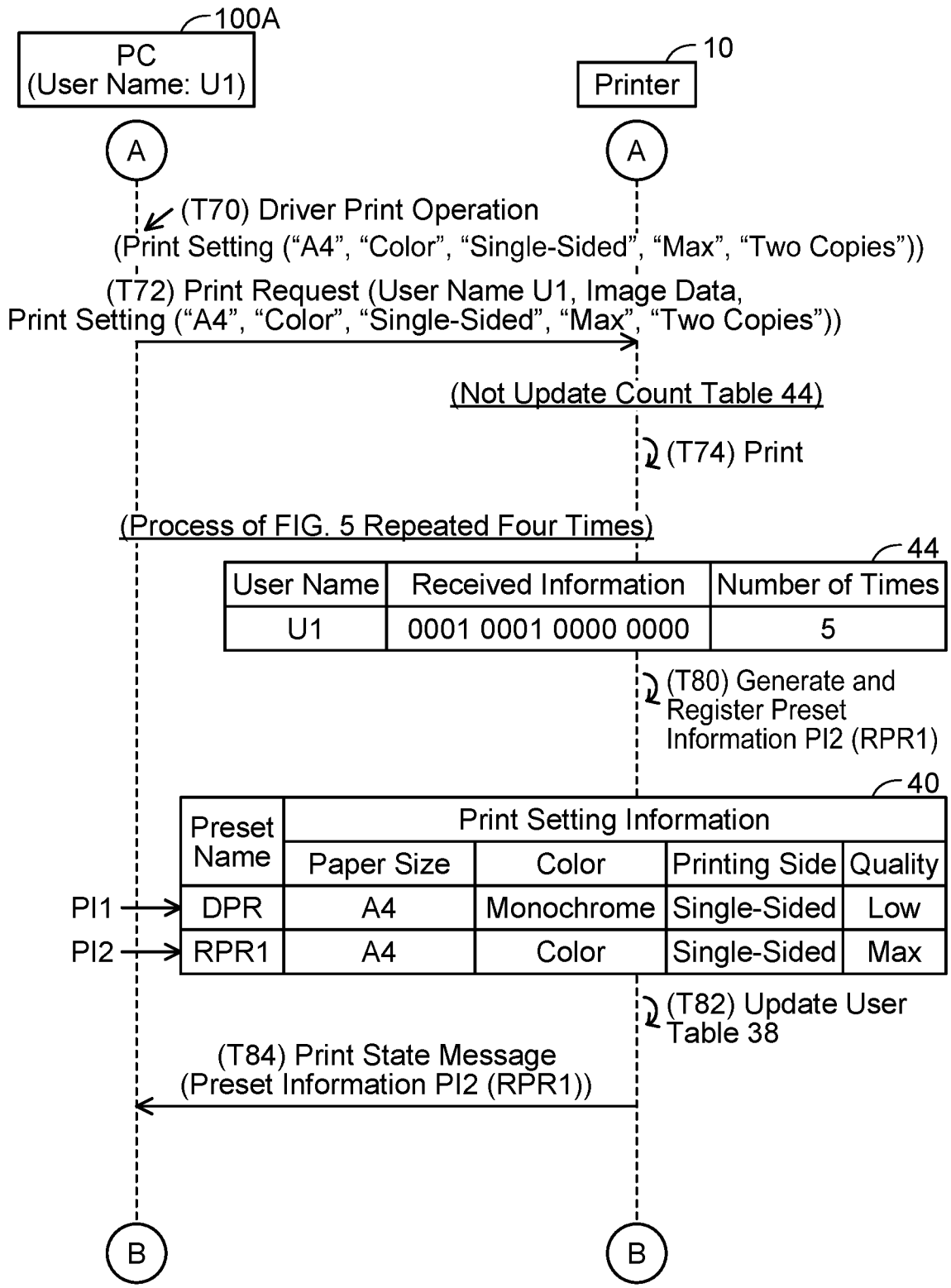
FIG. 6 shows a sequence diagram subsequent to FIG. 5.
Figure 7:
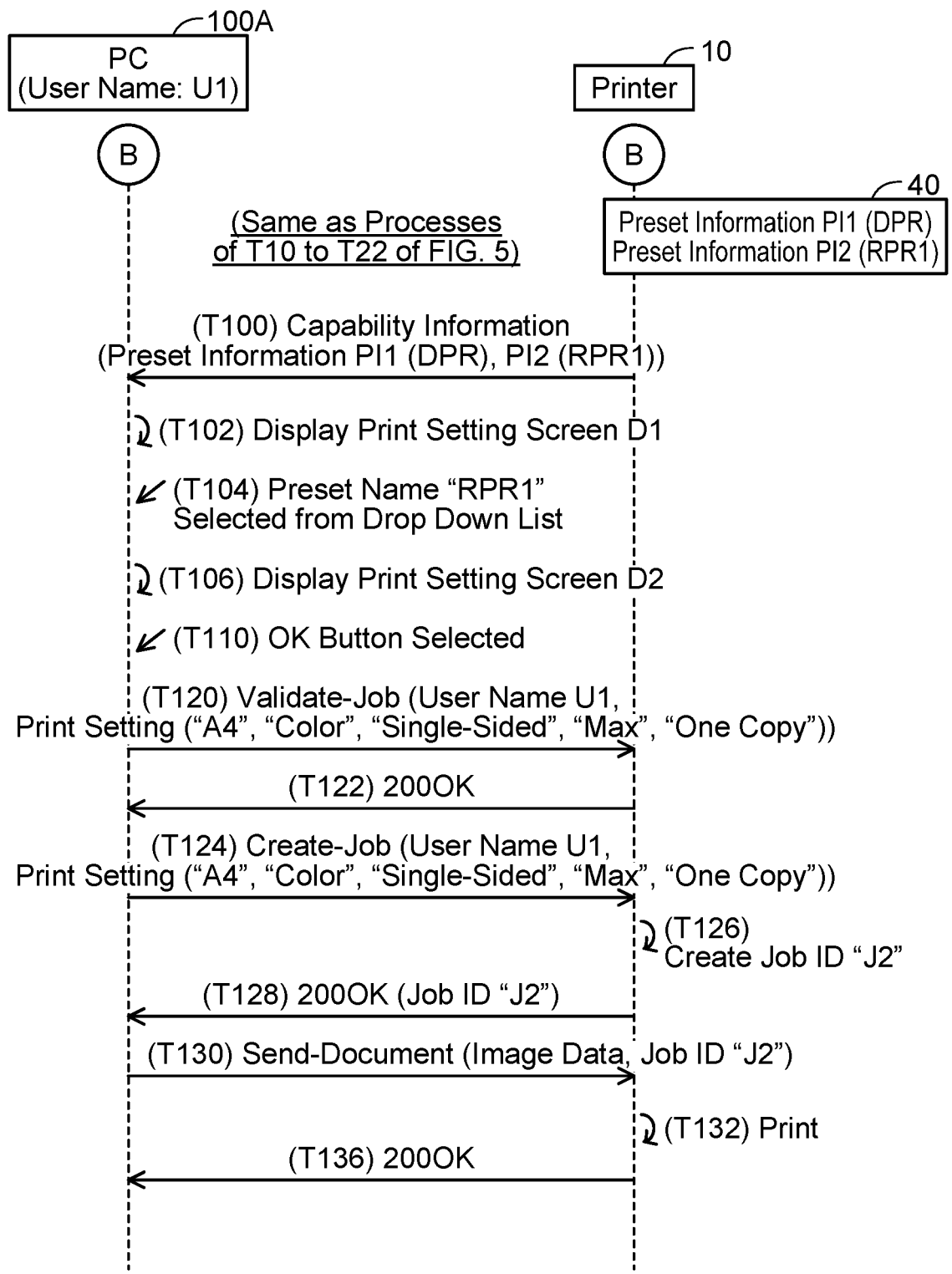
FIG. 7 shows a sequence diagram subsequent to FIG. 6.

(Case A; FIGS. 5-7)

In the initial state of FIG. 5, only default preset information PI1 is stored in the preset table 40 of the printer 10. Accordingly, in the user table 38, only the preset name DPR for identifying the preset information PI1 is associated with each username as the registered preset name. In the user table 38, each of the preset request flag and the SPA flag associated with the username U1 indicates "OFF".

When receiving the IPP print operation for executing printing according to the IPP in T10, the PC 100A sends the GPA including the preset request to the printer 10 in T12.

When receiving the GPA from the PC 100A in T12 (the trigger of the process of FIG. 3), the printer 10 determines that a username and a password are not included in the GPA (NO in S10), and sends the authentication information request to the PC 100A in T14 (S20).

When receiving the authentication information request from the printer 10 in T14, the PC 100A displays the authentication screen in T16. When accepting inputs of the username U1 and the password P1 in T18, the PC 100A sends the GPA including the preset request, the username U1, and the password P1 to the printer 10 in T20.

When receiving the GPA from the PC 100A in T20 (the trigger of the process in FIG. 3), the printer 10 determines in T22 that the user authentication using the username U1 and the password P1 is successful (YES in S10, YES in S12). Next, in T24, the printer 10 changes the preset request flag associated with the username U1 in the user table 38 to "ON" (YES in S14, YES in S16, and S18).

Next, the printer 10 identifies the preset name DPR associated with the username U1 in the GPA from the user table 38, and identifies the preset information PI1 including the identified preset name DPR from the preset table 40. Then, the printer 10 sends capability information including the identified preset information PI1 to the PC 100A in T26 (S30).

Figure 13:
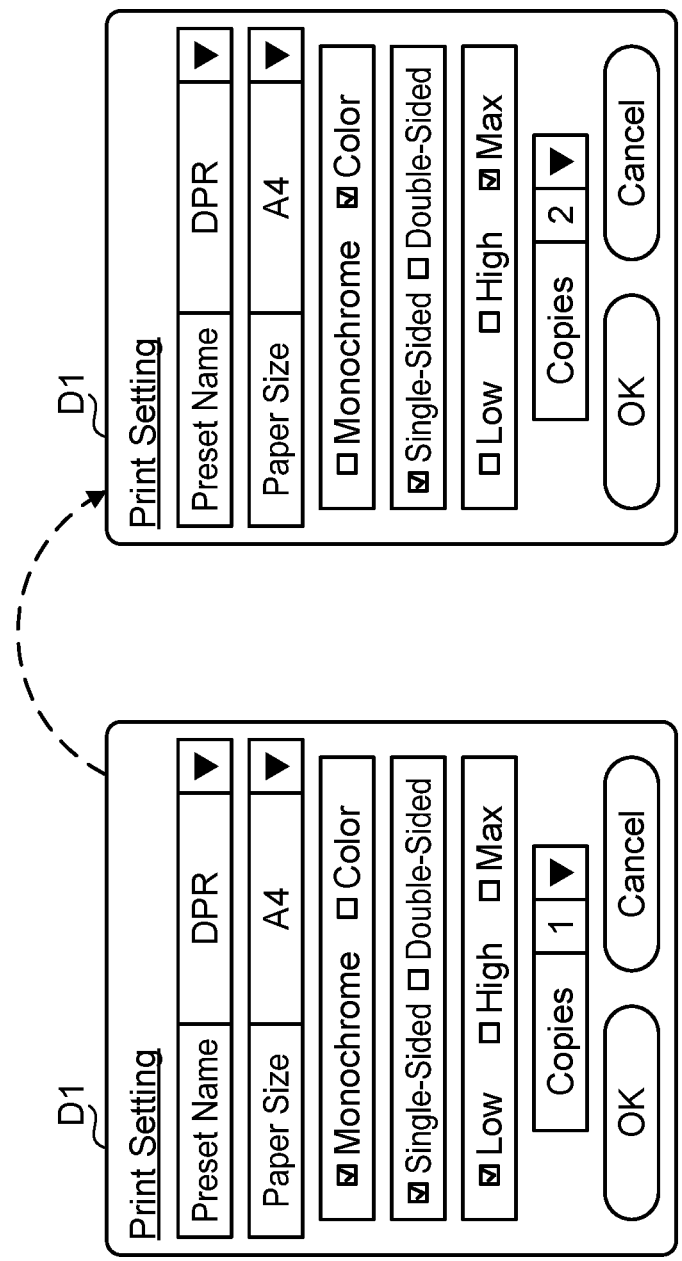
FIG. 13 shows an example of a screen displayed on a PC.

When receiving the capability information from the printer 10 in T26, the PC 100A displays the print setting screen D1 in T30. The screen D1 on the left side of FIG. 13 is an initial-state screen D1 displayed on the PC 100A. The screen D1 includes a preset name selection field for selecting a preset name, a paper size selection field for selecting a paper size, a check box group for selecting the number of colors and the like, and the number of copies selection field for selecting the number of copies to be printed. In the initial state of the screen D1, the preset name DPR in the preset information PI1 included in the capability information of T26 is displayed in the preset name selection field. In the paper size selection field and the check box group, the print setting information in the preset information PI1 (see "A4," "monochrome," "single-sided," and "Low" in the preset information PI1 of FIG. 2) is displayed. Specifically, "A4" is displayed in the paper size selection field, and checks are given to the check boxes corresponding to "monochrome", "single-sided", and "Low". In addition, a predetermined default value "1" is displayed in the number of copies selection field.

In T32, the PC 100A accepts a check to "color" instead of "monochrome", a check to "Max" instead of "Low", and selection of the number of copies "2" (see screen D1 on the right side of FIG. 13). Thereafter, when accepting the selection of the OK button in T40, the PC 100A sends a Validate-Job command (hereinafter referred to as "VJ") according to the IPP to the printer 10 in T50. The VJ command includes the username U1 and five setting values (i.e., "A4", "color", "single-sided", "Max", and "two copies") that have been selected on the screen D1.

When receiving the VJ from the PC 100A in T50, the printer 10 sends a 2000K to the PC 100A in T52.

When receiving the 2000K from the printer 10 in T52, the printer 10 sends the CJ to the printer 10 in T54. The CJ contains the same information as the information in the VJ.

When receiving the CJ from the PC 100A in T54 (the trigger of the process of FIG. 4), the printer 10 generates a job ID "J1" in T56 and sends the 2000K including the job ID "J1" to the PC 100A in T58.

The printer 10 updates the count table 44 in T60 (YES in S100, S102). Specifically, the printer 10 identifies the four setting values (i.e., "A4", "color", "single-sided", and "Max") except the number of copies "2" from the five setting values included in the CJ. The printer 10 identifies the four code values corresponding to the identified four setting values by using the setting value table 42, and generates the received information "0001 0001 0000 0000". Then, the printer 10 newly stores the username U1, the received information, and the number of times information "1" in the count table 44 in association with each other.

When receiving the 2000K from the printer 10 in T58, the PC 100A sends a Send-Document command (hereinafter, referred to as "SD") according to the IPP to the printer 10 in T62. The SD includes the image data representing an image to be printed and the job ID "J1" in the 2000K of T58.

When receiving the SD from the PC 100A in T62, the printer 10 executes printing in T64 (S110). Specifically, the printer 10 converts the image data in the SD according to the five setting values in the CJ, generates the print data, and executes printing according to the print data. Then, in T66, the printer 10 sends the 2000K to the PC 100A. Then, the printer 10 determines that no received information associated with the number of times information "5" exists in the count table 44 (YES in S120 and NO in S122) and does not generate the preset information.

(Continuation of FIG. 5; FIG. 6)

As shown in FIG. 6, in T70, the PC 100A accepts a driver print operation for executing printing using a print driver. The print driver is not a program for executing printing according to the IPP, but a program for executing printing according to, for example, an original protocol of a vendor of the printer 10. In the driver printing operation, the same five setting values (i.e., "A4", "color", "single-sided", "Max" and "two copies") as those of T32 in FIG. 5 are selected. Then, in T72, the PC 100A sends a print request including the username U1, the image data, and the aforementioned five setting values to the printer 10. The print request is a print request according to a different protocol (i.e., scheme) from the IPP.

When receiving the print request from the PC 100A in T72, the printer 10 executes printing in T74. Specifically, the printer 10 converts the image data included in the print request according to the five setting values included in the print request, generates the print data, and executes printing according to the print data. Here, the printer 10 does not update the count table 44. That is, when receiving the CJ according to the IPP, the printer 10 updates the count table 44 (T60 in FIG. 5), but does not update the count table 44 when receiving the print request according to a scheme different from the IPP. Consequently, the printer 10 can appropriately update the count table 44 based only on commands according to the IPP.

Thereafter, the same processes as T10 to T66 in FIG. 5 are repeated four times. Consequently, in the count table 44, the number of times information "5" is stored in association with the username U1 and the received information "0001 0001 0000 0000". In this case, the printer 10 determines that the received information associated with the number of times information "5" exists (YES in S122), and generates preset information PI2 in T80 (S124). Specifically, the printer 10 first reproduces the four setting values (i.e., "A4", "color", "single-sided", and "Max") from the received information "0001 0001 0000 0000" using the setting value table 42. Then, the printer 10 generates the preset information PI2 including the preset name RPR1 and the four setting values, and registers the preset information PI2 in the preset table 40. The printer 10 further updates the user table 38 in T82 (S124). Specifically, the printer 10 stores the preset name RPR1 as a registered preset name in association with the username U1.

The printer 10 sends a PSM according to the IPP to the PC 100A in T84 (S126). The PSM includes a message indicating that new preset information has been registered and the preset information PI2. Although not shown, the message and the preset information PI2 in the PSM are displayed on the PC 100A, as a result of which the user can acknowledge that the preset information PI2 including the setting values frequently used by the user himself/herself has been newly registered in the printer 10.

(Continuation of FIG. 6; FIG. 7)

Thereafter, as shown in FIG. 7, the same processes as T10 to T22 in FIG. 5 are executed. In this case, the printer 10 identifies the preset names DPR and RPR1 associated with the username U1 in the GPA from the user table 38, and identifies the preset information PI1 including the preset name DPR and the preset information PI2 including the preset name RPR1 from the preset table 40. Then, in T100, the printer 10 sends to the PC 100A the capability information including the two pieces of preset information PI1, PI2 identified (S30 of FIG. 30).

Figure 14:
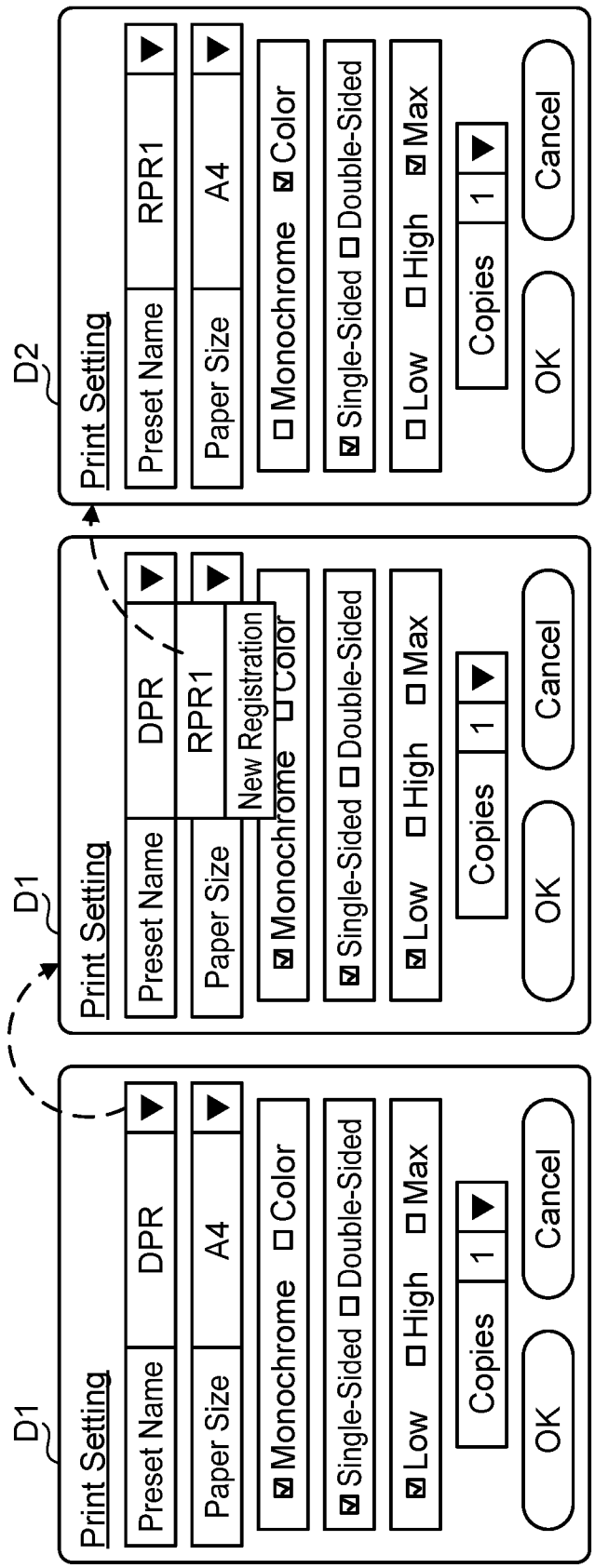
FIG. 14 shows an example of a screen displayed on the PC.

When receiving the capability information from the printer 10 in T100, the PC 100A displays a screen D1 in T102. The initial state of the screen D1 is the same as the initial state of the screen D1 of T30 of FIG. 5 (see the screen D1 on the left side of FIG. 13). The leftmost screen D1 of FIG. 14 is the same as the screen D1 on the left side of FIG. 13. Here, when accepting the selection of the drop down list at the preset selection field in the screen D1 in T104, the drop down image is displayed as shown in the screen D1 at the center of FIG. 14. The pull-down image includes preset names (i.e., DPR, RPR1) included in the capability information and a character string "new registration".

When accepting the selection of the preset name RPR1 in the drop down image in T104, a print setting screen D2 showing the setting values (i.e., "A4", "color", "single-sided", and "Max") in the preset information PI2 corresponding to the selected preset name RPR1 is displayed in T106 as shown in the rightmost screen D2 of FIG. 14. Then, when accepting the selection of the OK button in the screen D2 in T110, processes of T120 to T128 are executed. The processes of T120 to T128 are the same as the processes of T50 to T58 of FIG. 5 except that the job ID and the number of copies are different. Then, the printer 10 executes processes of T130 to T134 without incrementing the number of times information from "5" to "6". The processes of T130 to T134 are the same as the processes of T62 to T66 of FIG. 5 except that the image data and the job ID are different.

As shown in the above-described case A, each time the printer 10 receives the CJ, the printer 10 stores the number of times information in association with the received information (T60 in FIG. 5). Then, the printer 10 newly stores preset information PI2 when the number of times information associated with the received information indicates "5" (T80 in FIG. 6). As described above, the printer 10 can automatically store the preset information PI2 that has been used multiple times by the user without requiring the user to perform an operation for registering the preset information PI2 on the PC 100A. This can improve user convenience. Thereafter, the user can cause the printer 10 to execute printing according to the setting values indicated by the preset information PI2 by selecting the preset name RPR1 from the screen D1 (T104 of FIG. 7).

Figure 8:
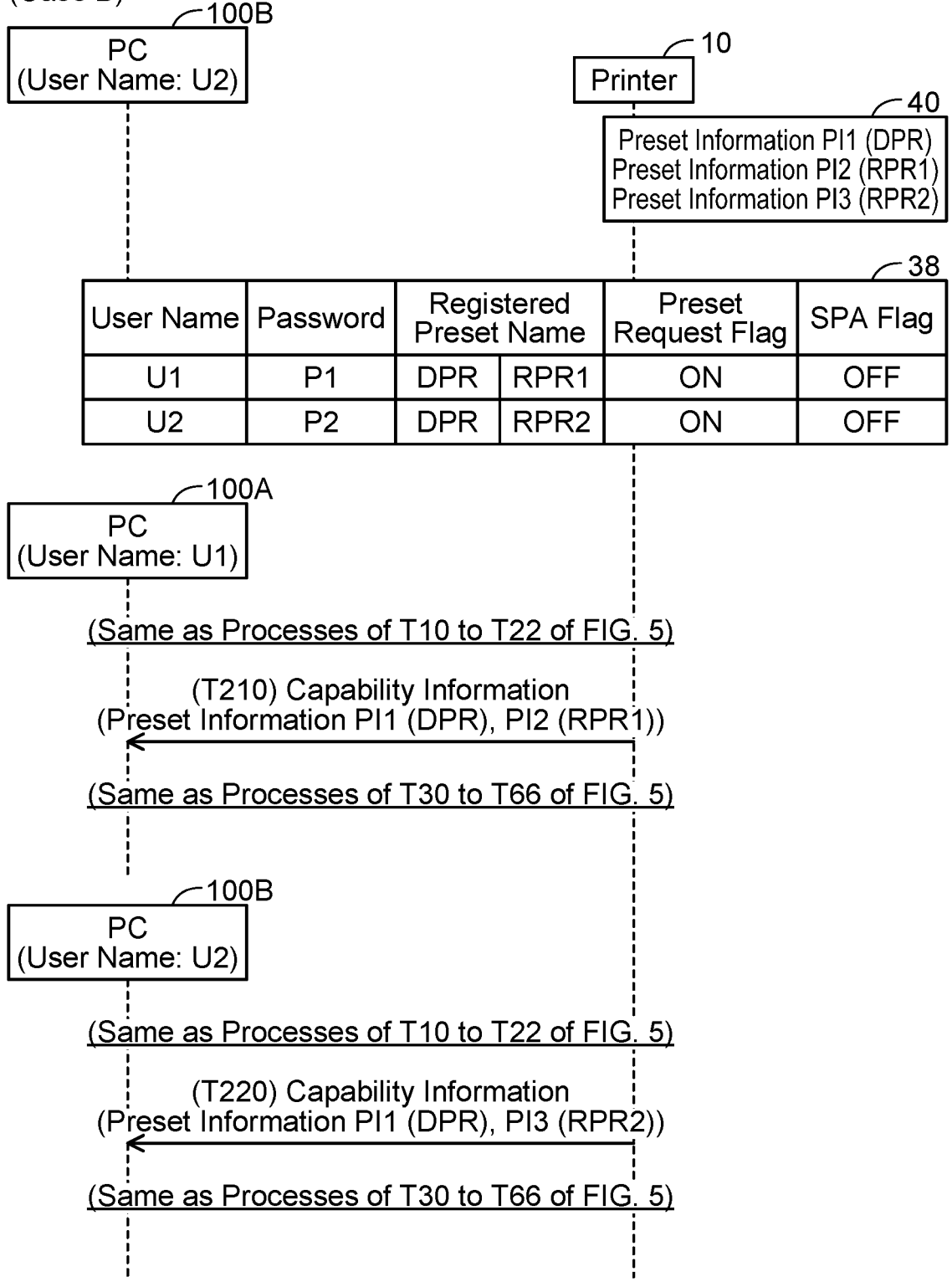
FIG. 8 shows a sequence diagram of Case B.

(Case B; FIG. 8)

Next, Case B will be described with reference to FIG. 8. In the initial state of Case B, the same processes as in Case A have been executed, and the preset information PI2 has been registered in the preset table 40. Further, the same processes as in Case A have already been executed between a PC 100B and the printer 10, and preset information PI3 including preset name RPR2 (see FIG. 2) is registered in the preset table 40. Consequently, in the user table 38, the preset name RPR1 is registered in association with the username U1, and the preset name RPR2 is registered in association with the username U2. As described above, the printer 10 stores the received information for each user and registers the preset information for each user. Consequently, the printer 10 can appropriately register preset information corresponding to a user.

The same processes as those of T10 to T22 in FIG. 5 are executed between the PC 100A and the printer 10. In this case, in T210, the printer 10 sends to the PC 100A capability information including the two pieces of preset information PI1, PI2 associated with the username U1 and not including the preset information PI3 associated with the username U2 from among the three pieces of preset information PI1 to PI3 registered in the preset table 40 (S30 in FIG. 3). Subsequent processes are the same as T30 to T66 of FIG. 5.

The same processes as those of T10 to T22 of FIG. 5 are executed between the PC 100B and the printer 10. In this case, in T220, the printer 10 sends to the PC 100B capability information including the two pieces of preset information PI1, PI3 associated with the username U2 and not including the preset information PI2 associated with the username U1 from among the three pieces of preset information PI1 to PI3 registered in the preset table 40 (S30 in FIG. 3). Subsequent processes are the same as T30 to T66 of FIG. 5.

As shown in Case B, the printer 10 registers the preset information for each user, by which the capability information including the preset information corresponding to each user can be sent to corresponding one of the PCs 100A and 100B. Consequently, in the PC 100A, the drop down image (see the screen D1 at the center of FIG. 14) showing the preset information PI3 for the user of the PC 100B is not displayed. Consequently, the user of the PC 100A can easily select his/her own preset information PI2. In addition, in the PC 100B, the drop down image showing the preset information PI2 for the user of the PC 100A is not displayed. Consequently, the user of the PC 100B can easily select his/her own preset information PI3.

Figure 9:
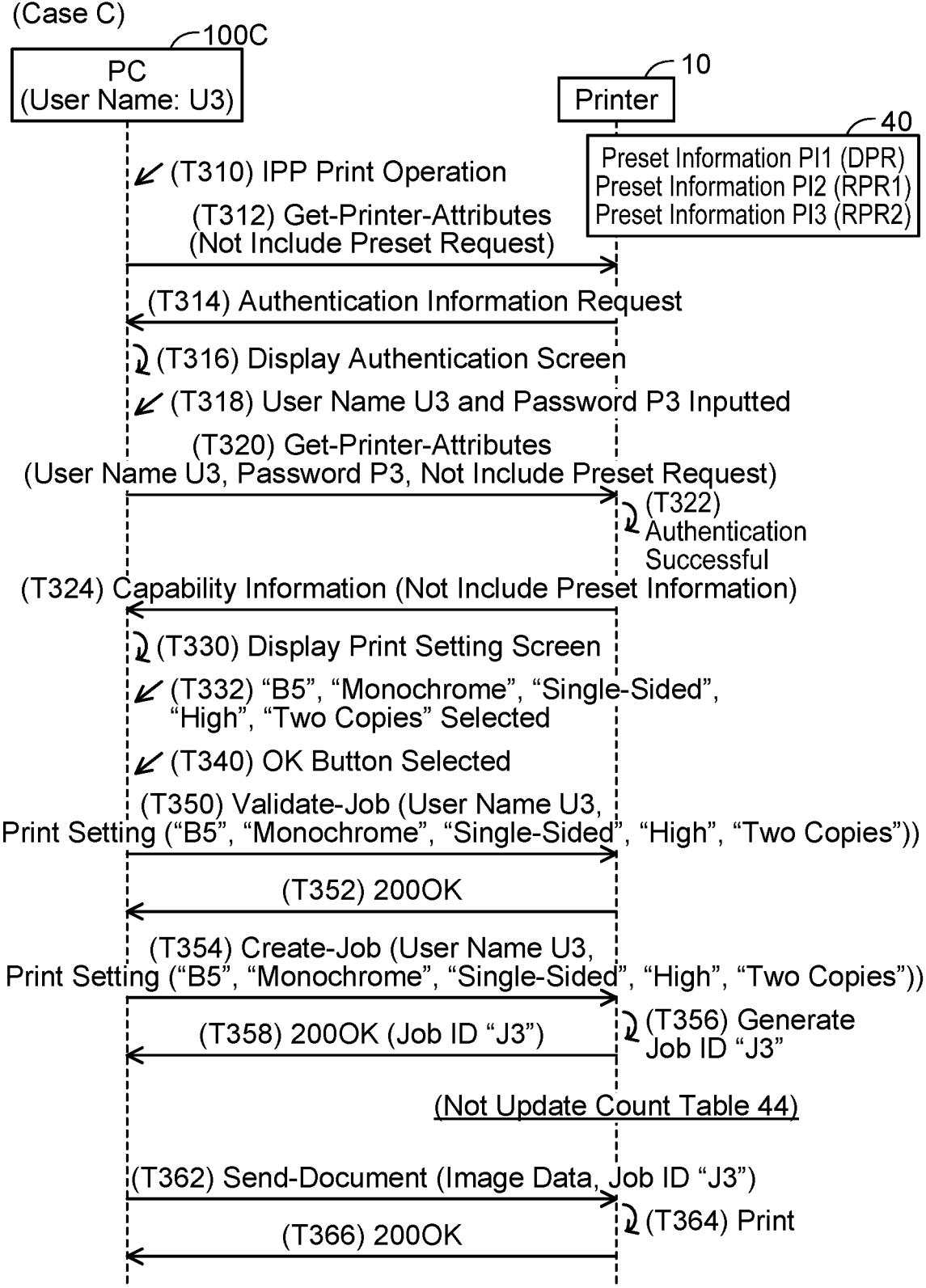
FIG. 9 shows a sequence diagram of Case C.

(Case C; FIG. 9)

Next, Case C will be described with reference to FIG. 9. In Case C, a PC 100C with the second type OS is used. As described above, the second type OS sends a GPA that does not include a preset request.

T310 is the same as T10 in FIG. 5. The PC 100C sends the GPA that does not include the preset request to the printer 10 in T312. T314 to T318 are the same as T14 to T18 of FIG. 5 except that the username and the password are different. The PC 100C sends to the printer 10 the GPA that includes the username U3 and the password P3 but does not include the preset request in T320.

T322 is the same as T22 in FIG. 5. In T324, the printer 10 sends capability information the does not include the preset information to the PC 100C (NO in S14 of FIG. 3, S40).

When receiving the capability information from the printer 10 in T324, the PC 100C displays a print setting screen in T330. In the print setting screen, unlike the screen D1 on the left side of FIG. 13, a preset name selection field is blank, the paper size selection field indicates a default value "A4", the check boxes are not checked, and the number of copies selection field indicates a default value "1".

When accepting selection of "B5", "monochrome", "single-sided", "High", and "two copies" in T332, and accepting selection of an OK button in T340, the PC 100 sends a VJ including these setting values to the printer 10 in T350. T352 to T358 are the same as T52 to T58 of FIG. 5 except that the setting values and the job ID are different.

Since the printer 10 determines that the preset request flag associated with the username U3 is "OFF" (NO in S100 of FIG. 4), the printer 10 does not update the count table 44. The subsequent processes of T362 to T366 are the same as T62 to T66 of FIG. 5 except that the image data and the job ID are different.

As shown in Case C above, the PC 100C cannot send the preset request to the printer 10. That is, the PC 100C cannot receive and utilize the preset information from the printer 10. Therefore, it is not necessary to store received information for registering the preset information corresponding to the user of the PC 100C. In order to prevent such unnecessary storage of the received information, the printer 10 does not store the received information even if the printer 10 receives the CJ from the PC 100C. This can reduce an amount of data to be stored in the memory 34 of the printer 10.

Figure 10:
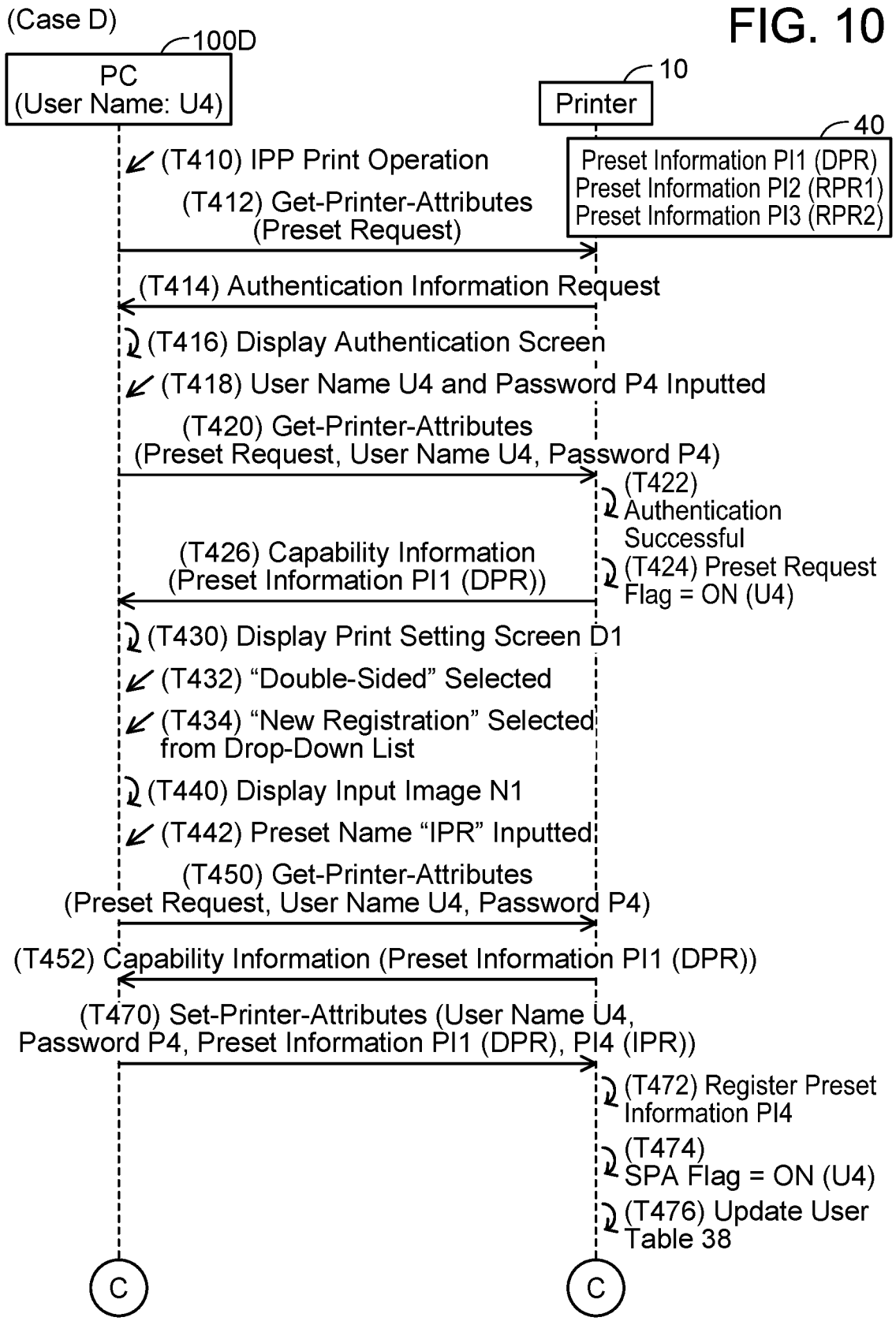
FIG. 10 shows a sequence diagram of Case D.
Figure 11:
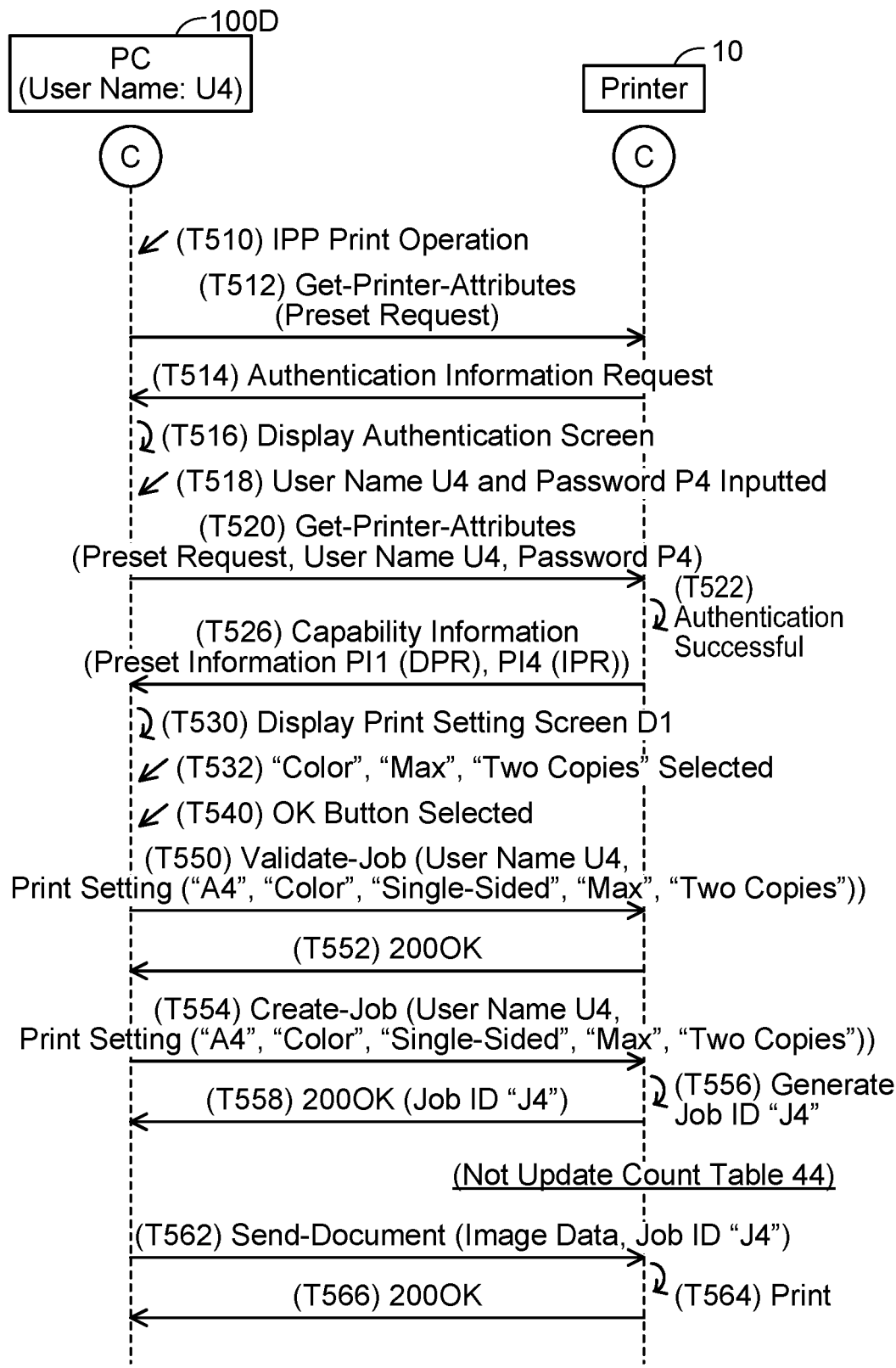
FIG. 11 shows a sequence diagram subsequent to FIG. 10.

(Case D; FIGS. 10 and 11)

Next, Case D will be described with reference to FIGS. 10 and 11. In case D, a PC 100D is used. T410 to T430 are the same as T10 to T30 of FIG. 5 except that the username and password are different.

Figure 15:
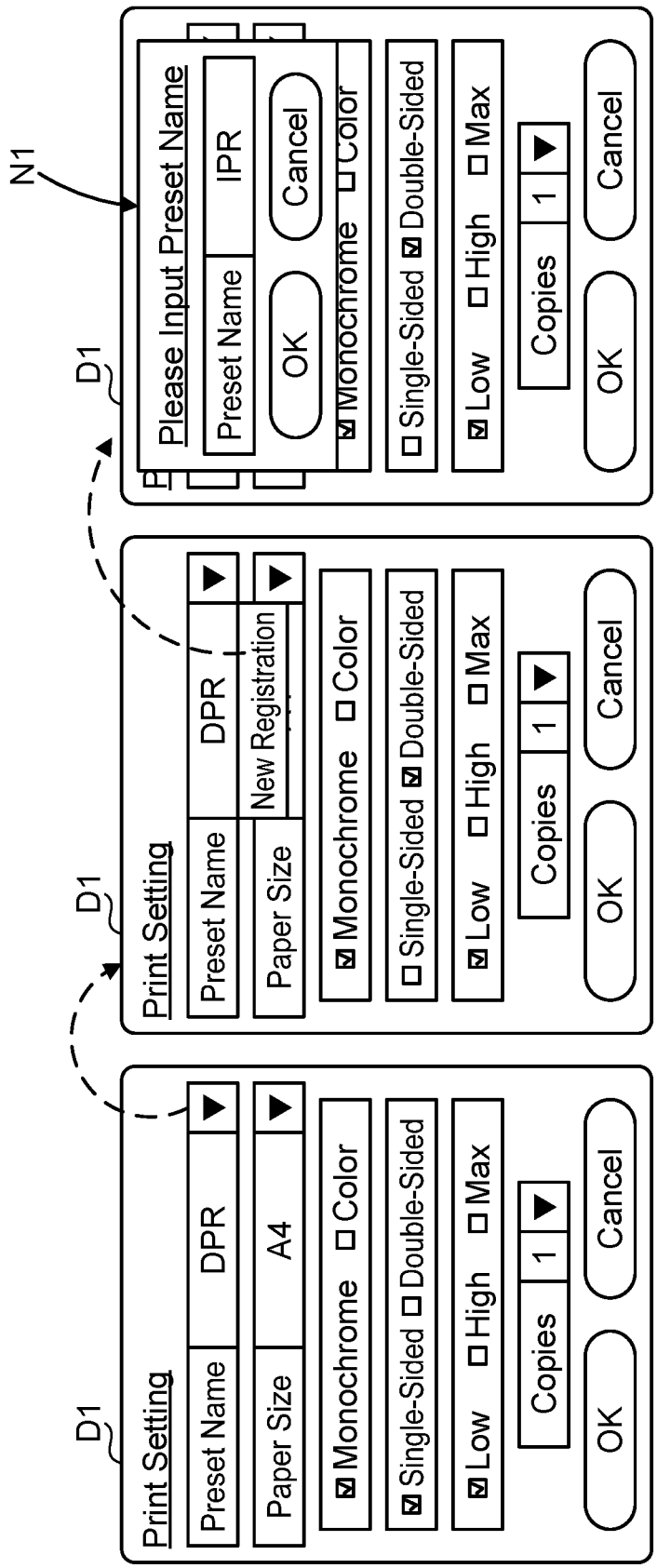
FIG. 15 shows an example of a screen displayed on the PC.

The PC 100D accepts selection of "double-sided" in T432 (see a screen D1 at the center of FIG. 15), and accepts selection of "new registration" in a drop down image in T434. In this case, the PC 100D displays an input image N1 in T440. As shown in the rightmost screen D1 of FIG. 15, the input image N1 includes an input column for inputting a preset name. The PC 100D accepts input of the preset name IPR in T442. When accepting selection of an OK button in the input image N1, the PC 100D sends the GPA again to the printer 10 in T450, and receives the capability information again from the printer 10 in T452.

Then, the PC 100D generates new preset information PI4. More specifically, the PC 100D generates the preset information PI4 indicating the setting values (i.e., "A4", "monochrome", "double-sided", and "Low") in the screen D1 displayed when "new registration" is selected in T434. Then, in T470, the PC 100D sends to the printer 10 the SPA including the username U4, the password P4, the preset information PI1 included in the capability information of T452, and the new preset information PI4.

When receiving the SPA from the PC 100D in T470, the printer 10 determines that the preset information PI1 in the SPA has already been registered in the preset table 40, and does not execute the process of newly registering the preset information PI1. In addition, the printer 10 determines that the preset information PI4 in the SPA has not been registered in the preset table 40, and newly registers the preset information PI4 in the preset table 40 in T472.

Next, the printer 10 updates the user table 38 in T474 and T476. Specifically, in T474, the printer 10 changes the SPA flag associated with the username U4 in the SPA from "OFF" to "ON". In addition, in T476, the printer 10 stores the preset name IPR included in the preset information PI4 as a registered preset name in association with the username U4 in the SPA.

(Continuation of FIG. 10; FIG. 11)

T510 to T522 of FIG. 11 are the same as T410 to T422 of FIG. 10. The printer 10 sends capability information including the two pieces of preset information PI1, PI4 to the PC 100D in T526.

When receiving the capability information from the printer 10 in T526, the PC 100D displays the print setting screen D1 in T530 and accepts selections of "color", "Max", and "two copies" in T532. T540 to T558 are the same as T40 to T58 in FIG. 5 except that the job ID and the setting values are different.

Since the printer 10 determines that the SPA flag associated with the username U4 is "ON" (NO in S100 of FIG. 4), the printer 10 does not update the count table 44. The subsequent processes of T562 to T566 are the same as T62 to T66 of FIG. 5 except that the image data and the job ID are different.

As shown in the above Case D, the user of the PC 100D can register the preset information PI4 in the printer 10 by operating the PC 100D, as shown in T434, T442, T472 of FIG. 10. It is not necessary to store the received information for registering the preset information for the user as in Case D who has a detailed knowledge of the IPP. In order to prevent such unnecessary storage of the received information, the printer 10 does not store the received information even if the printer 10 receives the CJ from the PC 100D. This can reduce an (Corresponding Relationships)

The preset information is an example of "print setting information". The four items of paper size, number of colors, printing side, and quality are examples of "M setting items". The five items including these four items and the number of copies are examples of "a plurality of setting items". "5" is an example of "predetermined value". The CJ is an example of "print request". The GPA is an example of "first predetermined command" and "second predetermined command" The SPA is an example of "third predetermined command". The preset request flag and the SPA flag are examples of "first flag information" and "second flag information", respectively. The PSM is an example of "notification information". The username U1 and the username U2 are examples of the "first user identification information" and "second user identification information", respectively. The received information in the uppermost column in the count table 44 and the preset information PI2 of FIG. 2 are examples of "first received information" and "first print setting information", respectively. The second received information from the top and the preset information PI3 are examples of "second received information" and "second print setting information", respectively.

The process of S18 and the process of S30 of FIG. 3 are examples of "store first flag information" and "send one or more pieces of print setting information", respectively. The trigger process, process of S102, process of S110, process of S124, and process of S126 of FIG. 4 are examples of "receive a specific print request", "store number of times information in the memory", "cause the print executing unit to print an image", "store first print setting information", and "send notification information", respectively. The process of T474 of FIG. 10 is an example of "store second flag information".

Second Embodiment; FIG. 12

Next, a second embodiment will be described with reference to FIG. 12. In the second embodiment, a method by which the printer 10 registers the preset information is different from the first embodiment.

When S110 of FIG. 4 ends, the CPU 32 ends the process of FIG. 4 without executing S120 to S126. When receiving a CJ including a certain username and setting values that are the same as the setting values indicated by a certain received information after the number of times information associated with a combination of the certain username and the certain received information reaches "5" (the trigger of the process of FIG. 4), the CPU 32 executes the process of S102 to increment the number of times information. That is, in the present embodiment, the number of times information may exceed "5".

Further, the CPU 32 executes a process for registering the preset information at a predetermined time in the beginning (i.e., the first day) of each month. Specifically, the CPU 32 first deletes all the preset names except the default preset name DPR from the user table 38. The CPU 32 also deletes all the preset information from the preset table 40 except the default preset information PI1. If preset information registered in accordance with the SPA is stored in the preset table 40, this preset information is not deleted from the preset table 40, and the preset name included in this preset information is not deleted from the user table 38.

Next, the CPU 32 identifies one username (e.g., U1) from the count table 44 and further identifies one piece of received information associated with the number of times information indicating the maximum number being "5" or more from among the one or more pieces of received information associated with this username. Then, the CPU 32 registers preset information in the preset table 40 based on the identified one piece of received information. The CPU 32 further registers the preset name included in the preset information in the user table 38 as the registered preset name in association with the username.

The CPU 32 executes the same processes on the other usernames in the count table 44. When the processes on all the usernames ends, the CPU 32 deletes all the information from the count table 44 (i.e., initializes the count table 44). By executing the above process every month, the preset information including setting values most frequently used by a user in previous month is registered for each user.

FIG. 12 shows an example of the count table 44 in February. In this example, three pieces of received information are stored in association with the username U1, and one piece of received information is stored in association with the username U2. In this case, the CPU 32 registers the preset information including the preset name RPR1 for the username U1 based on the received information associated with the number of times information "6". In addition, the CPU 32 registers the preset information including the preset name RPR2 for the username U2 based on the received information associated with the number of times information "5". Therefore, in March, each user can use the corresponding preset information registered here.

Thereafter, the count table 44 of March is generated. In this example, three pieces of received information are stored in association with the username U1, and two pieces of received information are stored in association with the username U2. In this case, the CPU 32 registers the preset information including the preset name RPR3 instead of the preset information including the preset name RPR1 for the username U1 based on the received information associated with the number of times information "10". Further, the CPU 32 registers the preset information including the preset name RPR4 in place of the preset information including the preset name RPR2 for the username U2 based on the received information associated with the number of times information "10". Therefore, in April, each user can use the corresponding preset information registered here.

According to the present embodiment, the printer 10 can register the preset information including setting values most frequently used in one month. In particular, the printer 10 automatically deletes the registered preset information from the preset table 40 every month. This can reduce an amount of data to be stored in the memory 34 of the printer 10.

(Corresponding Relationships)

One month of February and one month of March are examples of "first predetermined period" and "second predetermined period", respectively. The received information associated with the username U1 and the number of times information "6" in the count table 44 of February is an example of "first received information". The preset information registered based on the received information is an example of "first print setting information". The received information associated with the username U1 and the number of times information "10" in the count table 44 of March is an example of "third received information". The preset information registered based on the received information is an example of "third print setting information".

Third Embodiment; FIG. 16

Next, a third embodiment will be described with reference to FIG. 16. The third embodiment differs from the first embodiment in that the user is inquired whether to generate preset information in the situation where the preset information is to be generated (that is, the situation where the received information associated with the number of times information "5" exists).

In the third embodiment, at first, the same processes as those of FIG. 5 are executed. As a result, in the count table 44, number of times information "1" is stored in association with the username U1 and the received information "0001 0001 0000 0000" (see T60 in FIG. 5). In addition, in the present embodiment, an inquiry flag "OFF" is stored in association with the username U1, the received information, and the number of times information "1". The inquiry flag indicates one of "ON" indicating that an inquiry for inquiring whether to generate the preset information is sent and "OFF" indicating that the inquiry is not sent when the GPA including the associated username is received.

Thereafter, the same processes as T10 to T66 in FIG. 5 are repeated four times. As a result, in the count table 44, the number of times information "5" is stored in association with the username U1 and the received information "0001 0001 0000 0000". In this case, the printer 10 determines that the received information associated with the number of times information "5" exists, and changes the inquiry flag associated with the received information to "ON" in T610.

Thereafter, the same processes as T10 to T22 in FIG. 5 are executed. In this case, the printer 10 identifies the preset name DPR associated with the username U1 in the GPA from the user table 38, and identifies the preset information PI1 including the preset name DPR from the preset table 40. The printer 10 confirms that the inquiry flag associated with the username U1, the received information "0001 0001 0000 0000", and the number of times information "5" indicating "ON". The printer 10 sends to the PC 100A the capability information including the identified preset information PI1 and an inquiry screen data representing an inquiry screen D3 for inquiring the user whether to register as the preset in T620. The inquiry screen data includes four setting values "A4", "color", "single-sided", and "Max" indicated by the received information "0001 0001 0000 0000". Then, the printer 10 changes the inquiry flag associated with the username U1, the received information "0001 0001 0000 0000", and the number of times information "5" to "OFF" in response to the capability information including the inquiry screen data having been sent in T622.

When receiving the capability information from the printer 10 in T620, the PC 100A displays the inquiry screen D3 represented by the inquiry screen data included in the received capability information in T624. The inquiry screen D3 includes a message inquiring the user whether to generate the preset, the setting values included in the received inquiry screen data, a YES button, and a NO button.

When accepting the selection of the YES button in the inquiry screen D3 from the user in T626, the PC 100A sends to the printer 10 the GPA including the preset request, the username U1, the password P1, and YES selection information in T630. The YES selection information includes the setting values (i.e., "A4", "color", "single-sided", and "Max") in the inquiry screen D3.

When receiving the GPA from the PC 100A in T630, the printer 10 determines that the GPA includes the YES selection information. In this case, the printer 10 executes the same processes as T80 to T84 of FIG. 6. Specifically, the printer 10 generates preset information PI2 including the preset name RPR1 and the setting values included in the received YES selection information (see T80). Then, the printer 10 updates the user table 38 by storing the preset name RPR1 as a registered press name in the user table 38 in association with the username U1 (see T82). Then, the printer 10 sends a PSM according to the IPP to the PC 100A (see T84). The subsequent processes are the same as the processes from T100 in FIG. 7. When the NO button in the inquiry screen D3 is selected instead of the process of T626, the GPA including NO selection information is sent to the printer 10. In this case, the printer 10 does not generate the preset information PI2. Then, the printer 10 sends the capability information including the preset information PI1 to the PC 100A as a response to the GPA including the NO selection information (see T26 in FIG. 5).

According to the above configuration, each time the printer 10 receives the CJ, the printer 10 stores the number of times information in association with the received information. When the number of times information associated with the received information indicates "5", the printer 10 sends the capability information including the inquiry screen data to the PC 100A (T620 in FIG. 16). Consequently, the user can acknowledge that the preset information PI2 can be stored by viewing the inquiry screen D3 (see T624). In addition, the printer 10 stores the preset information PI2 when the information indicating that the preset information PI2 is to be stored is received from the PC 100A (T630). As such, the user can easily cause the printer 10 to store the preset information PI2 used by the user for a plurality of times by selecting the YES button in the inquiry screen D3. This can improve user convenience. The PC 100A is an example of "first external device" and "second external device". The five setting values included in the CJ sent in T124 of FIG. 7 referred to in FIG. 16 (i.e., "A4", "color", "one side", "Max", and "one copy") are examples of "specific information". The process of T620 of FIG. 16 and the processes of T80 and T82 of FIG. 6 referred to in FIG. 16 are examples of "send an inquiry" and "store the first print setting information", respectively.

Figure 17:
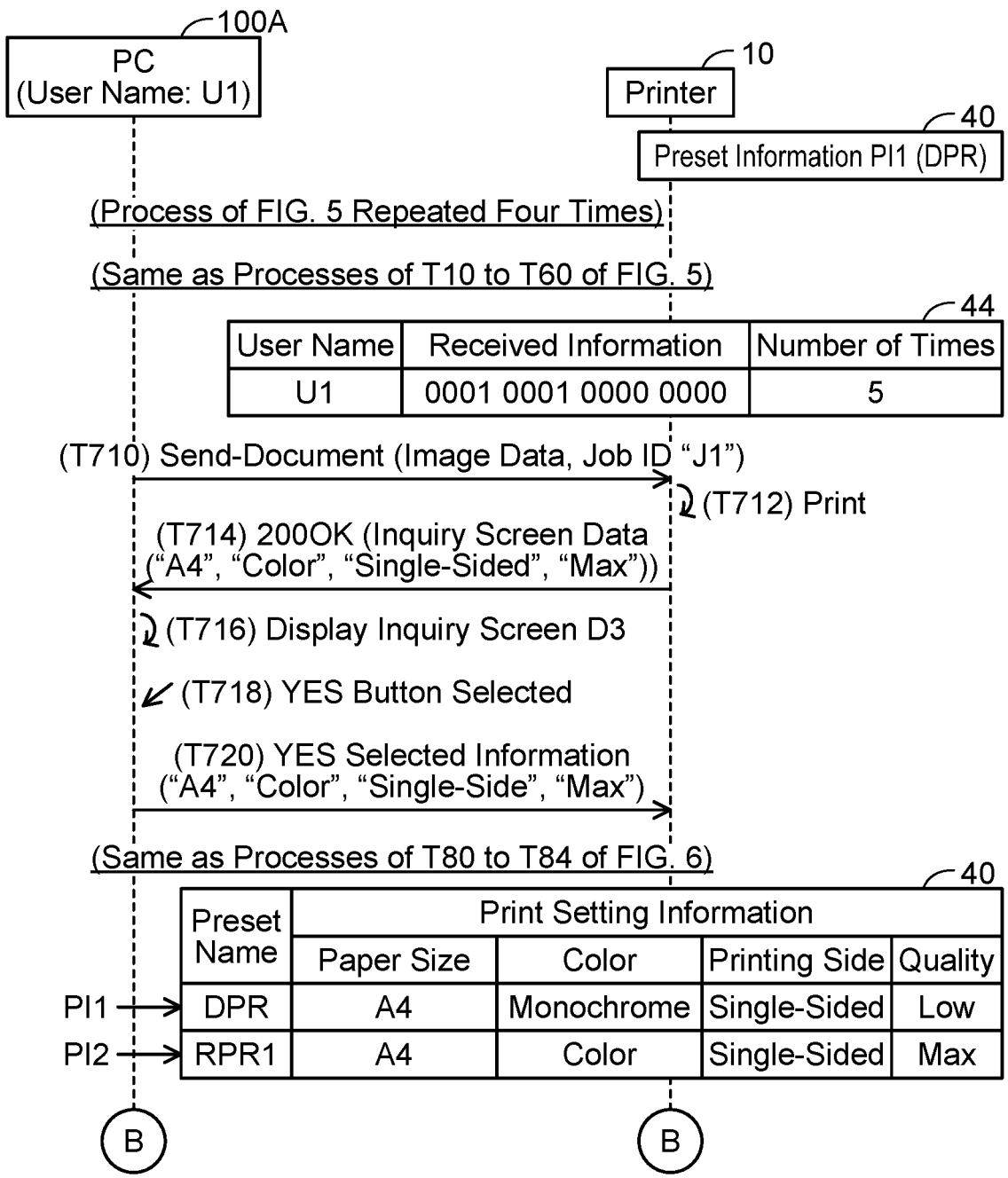
FIG. 17 shows a sequence diagram of a fourth embodiment.

Fourth Embodiment; FIG. 17

Next, a fourth embodiment will be described with reference to FIG. 17. In the fourth embodiment, a timing at which the inquiry screen data is sent is different from the third embodiment.

In the fourth embodiment, at first, the same processes as T10 to T66 of FIG. 5 are repeated four times. Thereafter, the same processes as T10 to T60 of FIG. 5 are executed. As a result, in the count table 44, the number of times information "5" is stored in association with the username U1 and the received information "0001 0001 0000 0000". Processes of T710 to T712 are the same as the processes of T62 to T64 of FIG. 5. The printer 10 sends a 2000K including the inquiry screen data to the PC 100A in T714.

Processes of T716 to T718 are the same as the processes of T624 to T626 of FIG. 16. Then, the PC 100A sends the YES selection information to the printer 10 in T720. The YES selection information includes the username U1 and setting values (i.e., "A4", "color", "single-sided", "Max") in the inquiry screen D3.

When receiving the YES selection information from the PC 100A in T720, the printer 10 executes the same processes as T80 to T84 of FIG. 6. The specific processes are the same as the processes of T80 to T84 in FIG. 6 referred to in the third embodiment. The process of T714 of FIG. 17 is an example of a process executed by "send an inquiry".

(Variant 1) The received information may not be a code value in which a setting value is coded, but may be a setting value itself.

(Variant 2) The printer 10 may not update the count table 44 when the target username included in the CJ and the preset information (hereinafter, referred to as "target preset information") including four setting values corresponding to four items included in the CJ (that is, paper size, the number of colors, printing side, and quality) have been registered in the user table 38 and the preset table 40 in association with each other. Specifically, the CPU 32 determines whether the target username and the target preset information have been registered in the user table 38 and the preset table 40 in association with each other prior to executing the process of S100 of FIG. 4. When determining that the target username and the target preset information have been registered, the CPU 32 may skip the processes of S100 and S102 and proceed to S110. The same determinations may also be executed between the processes of S110 and S120. In this case, the CPU 32 may skip the processes of S120 to S126 and end the process of FIG. 4 when determining that the target username and the target preset information have already registered. In the present variant, for example, even if a CJ including four setting values (i.e., "A4", "monochrome", "single-sided" and "Low") included in default preset information PI1 preregistered at the stage of shipment is received, the count table 44 does not need to be updated. This is because the preset information including these four setting values have already been registered, thereby it is unnecessary to store the number of times information.

(Variant 3) In S102 of FIG. 4, the printer 10 may not store the received information in the count table 44 in association with the username. For example, when receiving a CJ including a first username and a certain setting value group, the printer 10 may store the number of times information "1" in association with the certain setting value group, and then, when receiving a CJ including a second username different from the first username and the same setting value group, the printer 10 may increment the number of times information associated with the certain setting value group to "2". In this case, the printer 10 does not store the registered preset name in the user table 38 in association with the username. Then, when receiving the GPA from the PC, the printer 10 sends the capability information including all the preset information stored in the preset table 40 to the PC. In the present variant, the processes of S10, S12, and S20 in FIG. 3 can be omitted. In general terms, "store number of times information in the memory" may not include storing the received information and the number of times information in the memory in association with the user identification information. "Store first print setting information" may not include storing the print setting information in the memory in association with the user identification information. Further, "send one or more pieces of print setting information" may include sending all the print setting information to the external device when the first predetermined command is received.

(Variant 4) The user table 38 may not include the preset request flag. In this case, the printer 10 may only determine whether the SPA flag is OFF in S100 and S120 of FIG. 4. In this variant, "store first flag information" can be omitted.

(Variant 5) The user table 38 may not include the SPA flag. In this case, the printer 10 may only determine whether the preset request flag is ON in S100 and S120 of FIG. 4. In this variant, "store second flag information" can be omitted.

(Variant 6) The process of S126 of FIG. 4 is not limited to sending of the PSM (T84 of FIG. 6), and may be, for example, the following process. When receiving a signal including a preset information request according to Management Information Base (MIB) from the PC, the printer 10 may send a response signal including preset information to the PC. As a result, the preset information is displayed on the PC, and the user can acknowledge that the preset information has been newly registered in the printer 10. In the present variant, the process of sending the response signal to the PC is an example of the process executed by "send notification information". In another variant, when the login request for logging in to the web server in the printer 10 is received from the PC and authentication thereof is successful, the printer 10 may send to the PC status screen data indicating a status screen including the preset information. As a result, the status screen including the preset information is displayed on the PC, and the user can acknowledge that the preset information has been newly registered in the printer 10. In this variant, the process of sending the status screen data to the PC is an example of the process executed by "send notification information". In another variant, the process of S126 of FIG. 4 may not be executed. In this variant, "send notification information" can be omitted.

(Variant 7) The printer 10 may update the count table 44 when receiving a printing request according to a scheme different from the IPP scheme (e.g., the printing request of T72 in FIG. 6). That is, "store number of times information in the memory" may include storing the number of times information in association with the received information when the print request according to a scheme different from the IPP scheme is received.

(Variant 8) In T124 of FIG. 7, the PC 100A may send a CJ including the preset name RPR1 and one setting value "one copy" to the printer 10 instead of sending the CJ including the five setting values (i.e., "A4", "color", "one side", "Max", "one copy") to the printer 10. In this case, when receiving this CJ, the printer 10 identifies four setting values (i.e., "A4", "color", "single-sided", and "Max") corresponding to the preset names RPR1 from the preset table 40. Then, in T132, the printer 10 converts the image data according to the identified four setting values and the one setting value "one copy" included in the CJ, generates print data, and executes printing according to the print data. In the present variant, the combination of the preset name RPR1 and the one setting value "one copy" is an example of "specific information".

(Variant 9) In the third embodiment, when receiving the GPA from the PC 100A and determining that the inquiry flag indicates "ON", the printer 10 sends to the PC 100A the capability information including the inquiry screen data (see T620 of FIG. 16). Alternatively, the printer 10 may send only the inquiry screen data to the PC 100A in the above-described situation. If YES is selected in the inquiry screen D3, the PC 100A may send the YES selection information to the printer 10. When receiving the YES selection information from the PC 100A, the printer 10 may perform the same processes as T80 to T84 of FIG. 6 and generate the preset information PI2. In response to the GPA that has been received from the PC 100A, the printer 10 may send the capability information including the two pieces of preset information PI1, PI2 to the PC 100A as shown in T100 of FIG. 7.

(Variant 10) the respective processes of FIGS. 3 to 12 and FIGS. 16 to 17 are implemented by the CPU 32 of the printer 10 executing the program 36 (that is, software). Instead of this, one or more of the processes may be implemented by hardware such as a logic circuit.

What is claimed is:

1. A printer comprising:
   a print executing unit;
   a memory configured to store print setting information, the print setting information indicating M setting values corresponding to M setting items, M being an integer greater than or equal to 1;
   a communication interface; and
   a controller,
   wherein the controller is configured to:
   each time a print request including a plurality of setting values corresponding to a plurality of setting items including the M setting items is received via the communication interface, store number of times information in the memory in association with received information, the number of times information indicating a number of times the print request including the M setting items was received, and the received information indicating M setting values corresponding to the M setting items among the plurality of setting values included in the print request;
   in a case where first number of times information is stored in the memory in association with first received information and the first number of times information indicates that the number of times the print request was received is greater than or equal to a predetermined value which is greater than one, store first print setting information as new print setting information in the memory, the first print setting information indicating M setting values indicated by the first received information;
   in a case where a first predetermined command is received from an external device via the communication interface after the first print setting information has been stored in the memory, send one or more pieces of print setting information including the first print setting information stored in the memory to the external device via the communication interface;
   in a case where the first print setting information is selected among the one or more pieces of print setting information at the external device after the one or more pieces of the print setting information have been sent to the external device, receive a specific print request including specific information from the external device via the communication interface, the specific information being information for specifying a plurality of setting values including the M setting values indicated by the first print setting information; and
   in a case where the specific print request is received from the external device, cause the print executing unit to print an image to be printed according to the plurality of setting values specified by the specific information included in the specific print request.

2. The printer as in claim 1, wherein
   each time the print request including user identification information and the plurality of setting values is received, the controller is configured to store the number of times information in the memory in association with the received information and the user identification information included in the print request,
   in a first case where the first number of times information is stored in the memory in association with first user identification information and the first received information, and the first number of times information indicates that a number of times the print request was received is greater than or equal to the predetermined value, the controller is configured to store the first print setting information in the memory as the new print setting information, and
   in a second case where second number of times information is stored in the memory in association with second user identification information different from the first user identification information and second received information, and the second number of times information indicates that a number of times the print request was received is greater than or equal to the predetermined value, the controller is configured to store second print setting information in the memory as the new print setting information, the second print setting information indicating M setting values indicated by the second received information.

3. The printer as in claim 2, wherein
   in the first case, the controller is configured to store the first print setting information in the memory as the new print setting information in association with the first user identification information,
   in the second case, the controller is configured to store the second print setting information in the memory as the new print setting information in association with the second user identification information,
   in a case where the first predetermined command including the first user identification information is received from the external device after the first print setting information and the second print setting information have been stored in the memory, the controller is configured to send the one or more pieces of print setting information to the external device, the one or more pieces of print setting information including the first print setting information associated with the first user identification information in the memory and not including the second print setting information associated with the second user identification information in the memory, and in a case where the first predetermined command including the second user identification information is received from the external device after the first print setting information and the second print setting information have been stored in the memory, the controller is configured to send the one or more pieces of print setting information to the external device, the one or more pieces of print setting information including the second print setting information associated with the second user identification information in the memory and not including the first print setting information associated with the first user identification information in the memory.

4. The printer as in claim 2, wherein
the controller is further configured to:

in a case where a second predetermined command including user identification information is received via the communication interface, store first flag information in the memory in association with the user identification information, the second predetermined command being for requesting sending of the print setting information, wherein in a case where the print request including the plurality of setting values and user identification information associated with the first flag information is received, the controller is configured to store the number of times information in the memory in association with the received information and the user identification information included in the print request, and in a case where the print request including the plurality of setting values and user identification information which is not associated with the first flag information is received, the received information and the number of times information are not stored in association with the user identification information included in the print request.

5. The printer as in claim 2, wherein
the controller is further configured to:

in a case where a third predetermined command including user identification information is received via the communication interface, store second flag information in the memory in association with the user identification information, the third predetermined command being for requesting registration of print setting information;

wherein in a case where the print request including the plurality of setting values and user identification information which is not associated with the second flag information is received, the controller is configured to store the number of times information in the memory in association with the received information and the user identification information included in the print request, and in a case where the print request including the plurality of setting values and user identification information which is associated with the second flag information is received, the received information and the number of times information are not stored in association with the user identification information included in the print request.

6. The printer as in claim 1, wherein
each time the print request is received in a first predetermined period, the controller is configured to store the number of times information in the memory in association with the received information, the number of times information indicating a number of times the print request was received in the first predetermined period, each time the print request is received in a second predetermined period after the first period has passed, the controller is configured to store the number of times information in the memory in association with the received information, the number of times information indicating a number of times the print request was received in the second predetermined period, in a case where the first number of times information is stored in the memory in the first predetermined period in association with the first received information and the first number of times information indicates that the number of times the print request was received is greater than or equal to the predetermined value, the controller is configured to store the first print setting information in the memory as the new print setting information, and in a case where third number of times information is stored in the memory in the second predetermined period in association with third received information different from the first received information and the third number of times information indicates that the number of times the print request was received is greater than or equal to the predetermined value, the controller is configured to store third print setting information in the memory instead of the first print setting information as the new print setting information, the third print setting information indicating M setting values indicated by the third received information.

7. The printer as in claim 1, wherein
the controller is further configured to:

in a case where the first print setting information is stored in the memory as the new print setting information, send notification information to another device, the notification information being for indicating that the new print setting information has been stored.

8. The printer as in claim 1, wherein
each time the print request in conformity with Internet Printing Protocol (IPP) scheme is received, the controller is configured to store the number of times information in the memory in association with the received information, and in a case where a print request in conformity with a scheme different from the IPP scheme is received, the received information and the number of times information are not stored.

9. A printer comprising:
a print executing unit;
a memory configured to store print setting information, the print setting information indicating M setting values corresponding to M setting items, M being an integer greater than or equal to 1;
a communication interface; and
a controller,
wherein the controller is configured to:

each time a print request including a plurality of setting values corresponding to a plurality of setting items including the M setting items is received via the communication interface, store number of times information in the memory in association with received information, the number of times information indicating a number of times the print request including the M setting items was received, and the received information indicating M setting values corresponding to the M setting items among the plurality of setting values included in the print request;

in a case where first number of times information is stored in the memory in association with first received information and the first number of times information indicates that the number of times the print request was received is greater than or equal to a predetermined value which is greater than one, send an inquiry to a first external device via the communication interface, the inquiry being for inquiring of a user whether to store first print setting information in the memory as new print setting information, the first print setting information indicating M setting values indicated by the first received information;

in a case where information indicating that the first print setting information is to be stored in the memory as the new print setting information is received from the first external device via the communication interface, store the first print setting information as the new print setting information in the memory;

in a case where a first predetermined command is received from a second external device via the communication interface after the first print setting information has been stored in the memory, send one or more pieces of print setting information including the first print setting information stored in the memory to the second external device via the communication interface;

in a case where the first print setting information is selected among the one or more pieces of print setting information at the second external device after the one or more pieces of print setting information have been sent to the second external device, receive a first print request including specific information from the second external device via the communication interface, the specific information being information for specifying a plurality of setting values including the M setting values indicated by the first print setting information; and in a case where the first print request is received from the second external device, cause the print executing unit to print an image to be printed according to the plurality of setting values specified by the specific information included in the first print request.

10. The printer as in claim 9, wherein
in a case where the first predetermined command is received from the first external device after the first number of times information has reached the predetermined value, the controller is configured to send the inquiry to the first external device.

11. The printer as in claim 9, wherein
in a case where the first number of times information reaches the predetermined value in response to a second print request being received from the first external device via the communication interface, the controller is configured to send the inquiry to the first external device after printing of an image to be printed has been executed in response to the second print request.

12. The printer as in claim 9, wherein
each time the print request including user identification information and the plurality of setting values is received, the controller is configured to store the number of times information in the memory in association with the received information and the user identification information included in the print request, in a first case where the first number of times information is stored in the memory in association with first user identification information and the first received information, the first number of times information indicates that the number of times the print request was received is greater than or equal to the predetermined value, and the information indicating that the first print setting information is to be stored in the memory as the new print setting information is received, the controller is configured to store the first print setting information in the memory as the new print setting information, and in a second case where second number of times information is stored in the memory in association with second user identification information different from the first user identification information and second received information, the second number of times information indicates that the number of times the print request was received is greater than or equal to the predetermined value, and information indicating that second print setting information is to be stored in the memory as the new print setting information is received, the controller is configured to store the second print setting information in the memory as the new print setting information, the second print setting information indicating M setting values indicated by the second received information.

13. The printer as in claim 12, wherein
in the first case, the controller is configured to store the first print setting information in the memory as the new print setting information in association with the first user identification information, in the second case, the controller is configured to store the second print setting information in the memory as the new print setting information in association with the second user identification information, in a case where the first predetermined command including the first user identification information is received from the second external device after the first print setting information and the second print setting information have been stored in the memory, the controller is configured to send the one or more pieces of print setting information to the second external device, the one or more pieces of print setting information including the first print setting information associated with the first user identification information in the memory and not including the second print setting information associated with the second user identification information in the memory, and in a case where the first predetermined command including the second user identification information is received from the second external device after the first print setting information and the second print setting information have been stored in the memory, the controller is configured to send the one or more pieces of print setting information to the second external device, the one or more pieces of print setting information including the second print setting information associated with the second user identification information in the memory and not including the first print setting information associated with the first user identification information in the memory.

14. The printer as in claim 12, wherein
the controller is further configured to:
in a case where a second predetermined command including user identification information is received via the communication interface, store first flag information in the memory in association with the user identification information, the second predetermined command being for requesting sending of the print setting information, wherein in a case where the print request including the plurality of setting values and user identification information associated with the first flag information is received, the controller is configured to store the number of times information in the memory in association with the received information and the user identification information included in the print request, and in a case where the print request including the plurality of setting values and user identification information which is not associated with the first flag information is received, the received information and the number of times information are not stored in association with the user identification information included in the print request.

15. The printer as in claim 12, wherein
the controller is further configured to:
in a case where a third predetermined command including user identification information is received via the communication interface, store second flag information in the memory in association with the user identification information, the third predetermined command being for requesting registration of print setting information;
wherein in a case where the print request including the plurality of setting values and user identification information which is not associated with the second flag information is received, the controller is configured to store the number of times information in the memory in association with the received information and the user identification information included in the print request, and
in a case where the print request including the plurality of setting values and user identification information which is associated with the second flag information is received, the received information and the number of times information are not stored in association with the user identification information included in the print request.

16. The printer as in claim 9, wherein
each time the print request is received in a first predetermined period, the controller is configured to store the number of times information in the memory in association with the received information, the number of times information indicating a number of times the print request was received in the first predetermined period,
each time the print request is received in a second predetermined period after the first period has passed, the controller is configured to store the number of times information in the memory in association with the received information, the number of times information indicating a number of times the print request was received in the second predetermined period,
in a case where the first number of times information is stored in the memory in the first predetermined period in association with the first received information, the first number of times information indicates that the number of times the printing request was received is greater than or equal to the predetermined value, and the information indicating that the first print setting information is to be stored in the memory as new print setting information is received, the controller is configured to store the first print setting information in the memory as the new print setting information, and
in a case where third number of times information is stored in the memory in the second predetermined period in association with third received information different from the first received information, the third number of times information indicates that the number of times the print request was received is greater than or equal to the predetermined value, and information indicating that third print setting information is to be stored in the memory as the new print setting information is received, the controller is configured to store the third print setting information in the memory instead of the first print setting information as the new print setting information, the third print setting information indicating M setting values indicated by the third received information.

17. The printer as in claim 9, wherein
the controller is further configured to:
in a case where the first print setting information is stored in the memory as the new print setting information, send notification information to another device, the notification information being for indicating that the new print setting information has been stored.

18. The printer as in claim 9, wherein
each time the print request in conformity with Internet Printing Protocol (IPP) scheme is received, the controller is configured to store the number of times information in the memory in association with the received information, and
in a case where a print request in conformity with a scheme different from the IPP scheme is received, the received information and the number of times information are not stored.

19. A non-transitory computer-readable recording medium storing computer readable instructions for a printer, the printer comprising:
a print executing unit;
a memory configured to store print setting information, the print setting information indicating M setting values corresponding to M setting items, M being an integer greater than or equal to 1;
a communication interface; and
a processor,
wherein the computer readable instructions, when executed by the processor, cause the printer to:
each time a print request including a plurality of setting values corresponding to a plurality of setting items including M setting items is received via the communication interface, store number of times information in the memory in association with received information, the number of times information indicating a number of times the print request including the M setting items was received, and the received information indicating M setting values corresponding to the M setting items among the plurality of setting values included in the print request;
in a case where first number of times information is stored in the memory in association with first received information and the first number of times information indicates that the a number of times the print request was received is greater than or equal to a predetermined value which is greater than one, store first print setting information as new print setting information in the memory, the first print setting information indicating M setting values indicated by the first received information;
in a case where a first predetermined command is received from an external device via the communication interface after the first print setting information has been stored in the memory, send one or more pieces of print setting information including the first print setting information stored in the memory to the external device via the communication interface;

in a case where the first print setting information is selected among the one or more pieces of print setting information at the external device after the one or more pieces of the print setting information have been sent to the external device, receive a specific print request including specific information from the external device via the communication interface, the specific information being information for specifying a plurality of setting values including the M setting values indicated by the first print setting information; and in a case where the specific print request is received from the external device, cause the print executing unit to print an image to be printed according to the plurality of setting values specified by the specific information included in the specific print request.

20. A non-transitory computer-readable recording medium storing computer readable instructions for a printer:

the printer comprising:

a print executing unit;

a memory configured to store print setting information, the print setting information indicating M setting values corresponding to M setting items, M being an integer greater than or equal to 1;

a communication interface; and a processor, wherein the computer readable instructions, when executed by the processor, cause the printer to:

each time a print request including a plurality of setting values corresponding to a plurality of setting items including the M setting items is received via the communication interface, store number of times information in the memory in association with received information, the number of times information indicating a number of times the print request including the M setting items was received, and the received information indicating M setting values corresponding to the M setting items among the plurality of setting values included in the print request;

in a case where first number of times information is stored in the memory in association with first received information and the first number of times information indicates that the number of times the print request was received is greater than or equal to a predetermined value which is greater than one, send an inquiry to a first external device via the communication interface, the inquiry being for inquiring of a user whether a to store first print setting information in the memory as new print setting information, the first print setting information indicating M setting values indicated by the first received information;

in a case where information indicating that the first print setting information is to be stored in the memory as the new print setting information is received from the first external device via the communication interface, store the first print setting information as the new print setting information in the memory;

in a case where a first predetermined command is received from a second external device via the communication interface after the first print setting information has been stored in the memory, send one or more pieces of print setting information including the first print setting information stored in the memory to the second external device via the communication interface;

in a case where the first print setting information is selected among the one or more pieces of print setting information at the second external device after the one or more pieces of print setting information have been sent to the second external device, receive a first print request including specific information from the second external device via the communication interface, the specific information being information for specifying a plurality of setting values including the M setting values indicated by the first print setting information; and in a case where the first print request is received from the second external device, cause the print executing unit to print an image to be printed according to the plurality of setting values specified by the specific information included in the first print request.

* * * * *